United States Patent
Doane et al.

(10) Patent No.: US 7,170,481 B2
(45) Date of Patent: Jan. 30, 2007

(54) SINGLE SUBSTRATE LIQUID CRYSTAL DISPLAY

(75) Inventors: Joseph W. Doane, Kent, OH (US); Asad A. Khan, Kent, OH (US); Irina Shiyanovskaya, Stow, OH (US); Tod Schneider, Kent, OH (US); Oleg Pishnyak, Kent, OH (US); Seth E. Green, Kent, OH (US); Forrest N. Nicholson, Kent, OH (US); Liang-Chy Chien, Hudson, OH (US)

(73) Assignee: Kent Displays Incorporated, Kent, OH (US)

( * ) Notice: Subject to any disclaimer, the term of this patent is extended or adjusted under 35 U.S.C. 154(b) by 0 days.

(21) Appl. No.: 11/046,487

(22) Filed: Jan. 28, 2005

(65) Prior Publication Data

US 2005/0195354 A1 Sep. 8, 2005

Related U.S. Application Data

(63) Continuation of application No. 10/782,461, filed on Feb. 19, 2004, which is a continuation of application No. 11/006,100, filed on Dec. 7, 2004.

(60) Provisional application No. 60/539,873, filed on Jan. 28, 2004, provisional application No. 60/598,163, filed on Aug. 2, 2004, provisional application No. 60/484,337, filed on Jul. 2, 2003.

(51) Int. Cl.
G09G 3/36 (2006.01)

(52) U.S. Cl. .......................... 345/87; 345/31

(58) Field of Classification Search ............. 345/30, 345/83, 81, 87, 97, 103, 105, 204; 349/84, 349/90, 110, 113, 115, 123, 125, 126, 127, 349/132, 133, 137, 147, 153
See application file for complete search history.

(56) References Cited

U.S. PATENT DOCUMENTS 3,600,060 A 8/1971 Churchill
3,680,950 A 8/1972 Haas et al
(Continued)

FOREIGN PATENT DOCUMENTS

WO WO92/11311 7/1992
(Continued)

OTHER PUBLICATIONS

Jing-Jou Tang et al., *A 30-V/Column Driver for PSCT LCD Using High-Voltage BiMOS Process*, Online Article, dated 1999.
(Continued)

*Primary Examiner*—Nitin Patel
(74) *Attorney, Agent, or Firm*—Pearne & Gordon LLP

(57) ABSTRACT

The present invention relates to a display film that may be transferred by lamination or otherwise onto a substrate. The display film is formed of a stack of layers that can include different types, arrangements, and functionality within the stack depending upon factors including the characteristics of the substrate (e.g., upper or lower, transparent or opaque, substrates) and addressing of the display (e.g., active or passive matrix, electrical or optical addressing). The layers of the stacked display film include one or more electrode layers and one or more liquid crystal layers and, in addition, may include various combinations of an adhesive layer, preparation layer, casting layer, light absorbing layer, insulation layers, and protective layers. The liquid crystal layer can include cholesteric or other liquid crystal material. The liquid crystal layer can be a dispersion of liquid crystal in a polymer matrix formed by a variety of techniques. The display film may interact with components mounted on or laminated to the substrate, including a solar cell, active matrix backplane and electrodes. The display film may be mounted onto flexible or drapable substrates such as fabric and can itself be drapable. A liquid crystal display includes the display film and a single substrate for supporting the display film. Thus, the invention offers substantial flexibility in fabrication and design that has not been previously possible in the display industry.

67 Claims, 14 Drawing Sheets

U.S. PATENT DOCUMENTS

| | | | |
|---|---|---|---|
| 4,362,903 A | 12/1982 | Eichelberger et al. | |
| 4,510,188 A | 4/1985 | Ruggeri | |
| 4,642,250 A | 2/1987 | Spector | |
| 4,684,771 A | 8/1987 | Wuthrich | |
| 4,688,900 A | 8/1987 | Doane et al. | |
| 4,747,413 A | 5/1988 | Bloch | |
| 4,890,902 A | 1/1990 | Doane et al. | |
| 4,896,946 A | 1/1990 | Suzuki et al. | |
| 4,948,232 A | 8/1990 | Lange | |
| 5,007,872 A | 4/1991 | Tang | |
| 5,061,553 A | 10/1991 | Olsen, Jr. | |
| 5,161,479 A | 11/1992 | Mahr | |
| 5,172,108 A | 12/1992 | Wakabayashi et al. | |
| 5,200,845 A | 4/1993 | Crooker et al. | |
| 5,360,503 A | 11/1994 | Coffy | |
| 5,376,699 A | 12/1994 | Sage | |
| 5,437,811 A | 8/1995 | Doane et al. | |
| 5,453,863 A | 9/1995 | West et al. | |
| 5,493,430 A | 2/1996 | Lu et al. | |
| 5,530,457 A | 6/1996 | Helgeson | |
| 5,625,477 A | 4/1997 | Wu et al. | |
| 5,636,044 A | 6/1997 | Yuan et al. | |
| 5,644,330 A | 7/1997 | Catchpole et al. | |
| 5,668,614 A | 9/1997 | Chien et al. | |
| 5,691,795 A | 11/1997 | Doane et al. | |
| 5,734,155 A | 3/1998 | Rostoker | |
| 5,748,277 A | 5/1998 | Huang et al. | |
| 5,751,257 A | 5/1998 | Sutherland | |
| 5,815,136 A | 9/1998 | Ikeda et al. | |
| 5,847,798 A | 12/1998 | Yang et al. | |
| 5,889,572 A | 3/1999 | Takahashi et al. | |
| 5,981,408 A | 11/1999 | Nakagawa et al. | |
| 5,996,897 A | 12/1999 | Prancz | |
| 6,034,752 A | 3/2000 | Khan et al. | |
| 6,061,107 A | 5/2000 | Yang et al. | |
| 6,072,619 A | 6/2000 | Kiryuschev et al. | |
| 6,096,666 A | 8/2000 | Jachimowicz et al. | |
| 6,133,895 A | 10/2000 | Huang | |
| 6,154,190 A | 11/2000 | Yang et al. | |
| 6,224,964 B1 * | 5/2001 | Kawai et al. | 428/32.81 |
| 6,253,190 B1 | 6/2001 | Sutherland | |
| 6,268,839 B1 | 7/2001 | Yang et al. | |
| 6,268,841 B1 | 7/2001 | Cairns et al. | |
| 6,269,342 B1 | 7/2001 | Brick et al. | |
| 6,270,783 B1 | 8/2001 | Slavtcheff et al. | |
| 6,271,898 B1 | 8/2001 | Clikeman et al. | |
| 6,277,439 B1 | 8/2001 | Painter | |
| 6,278,429 B1 | 8/2001 | Ruth et al. | |
| 6,307,605 B1 * | 10/2001 | Bailey | 349/84 |
| 6,316,278 B1 | 11/2001 | Jacobsen et al. | |
| 6,320,563 B1 | 11/2001 | Yang et al. | |
| 6,359,673 B1 | 3/2002 | Stephenson | |
| 6,377,321 B1 | 4/2002 | Khan et al. | |
| 6,423,368 B1 | 7/2002 | Stephenson et al. | |
| 6,433,849 B1 | 8/2002 | Lowe | |
| 6,452,590 B1 | 9/2002 | Awamoto et al. | |
| 6,459,467 B1 | 10/2002 | Hashimoto et al. | |
| 6,468,638 B2 | 10/2002 | Jacobsen et al. | |
| 6,483,563 B2 | 11/2002 | Khan et al. | |
| 6,532,052 B1 | 3/2003 | Khan et al. | |
| 6,556,262 B1 | 4/2003 | Stephenson et al. | |
| 6,585,849 B2 | 7/2003 | Smith et al. | |
| 6,603,259 B1 | 8/2003 | Kiryuschev et al. | |
| 6,608,438 B2 | 8/2003 | Topelberg et al. | |
| 6,618,114 B1 | 9/2003 | Freeman | |
| 6,624,565 B2 | 9/2003 | Topelberg | |
| 6,628,256 B2 | 9/2003 | Nishimura | |
| 6,654,080 B1 | 11/2003 | Khan et al. | |
| 6,655,788 B1 * | 12/2003 | Freeman | 347/58 |
| 6,657,620 B2 | 12/2003 | Oishi et al. | |
| 6,697,191 B2 | 2/2004 | Kiryuschev et al. | |
| 6,710,760 B1 | 3/2004 | Johnson et al. | |
| 6,727,197 B1 | 4/2004 | Wilson et al. | |
| 6,788,362 B2 | 9/2004 | Stephenson et al. | |
| 6,819,310 B2 | 11/2004 | Huang et al. | |
| 6,850,217 B2 | 2/2005 | Huang et al. | |
| 6,864,435 B2 | 3/2005 | Hermanns et al. | |
| 6,902,454 B1 * | 6/2005 | Petruchik | 445/24 |
| 7,009,666 B2 | 3/2006 | Khan et al. | |
| 2001/0015712 A1 | 8/2001 | Hashimoto | |
| 2002/0030776 A1 | 3/2002 | Khan et al. | |
| 2002/0030786 A1 | 3/2002 | Stephenson | |
| 2002/0186182 A1 | 12/2002 | Stephenson et al. | |
| 2003/0011549 A1 | 1/2003 | Murahashi et al. | |
| 2003/0016329 A1 | 1/2003 | Smith et al. | |
| 2003/0019575 A1 | 1/2003 | Smith et al. | |
| 2003/0031845 A1 | 2/2003 | Umeya et al. | |
| 2003/0034945 A1 | 2/2003 | Mi et al. | |
| 2003/0063245 A1 | 4/2003 | Bowley et al. | |
| 2003/0071791 A1 | 4/2003 | Hanson et al. | |
| 2003/0085380 A1 | 5/2003 | Schuhmacher et al. | |
| 2003/0117548 A1 | 6/2003 | Stephenson | |
| 2003/0155151 A1 | 8/2003 | Hermanns et al. | |
| 2003/0160912 A1 | 8/2003 | Stephenson | |
| 2003/0169221 A1 | 9/2003 | Stephenson et al. | |
| 2003/0184569 A1 | 10/2003 | Koga et al. | |
| 2003/0202136 A1 | 10/2003 | Stephenson et al. | |
| 2003/0206147 A1 | 11/2003 | Mi et al. | |
| 2003/0222139 A1 | 12/2003 | Stephenson et al. | |
| 2004/0032545 A1 | 2/2004 | Stephenson et al. | |
| 2004/0080477 A1 | 4/2004 | Capurso et al. | |
| 2005/0001797 A1 | 1/2005 | Miller, IV et al. | |
| 2005/0007336 A1 | 1/2005 | Albert et al. | |
| 2005/0083284 A1 | 4/2005 | Huang et al. | |
| 2005/0162606 A1 | 7/2005 | Doane et al. | |

FOREIGN PATENT DOCUMENTS

| | | |
|---|---|---|
| WO | 2005/072447 | 8/2005 |
| WO | 2005/072455 | 8/2005 |
| WO | 2005/081779 | 9/2005 |

OTHER PUBLICATIONS http://www/us.semiconductors.philips.com/pip/PCF8578.html, LCD/row/column driver for dot matrix graphic displays, printed Jul. 8, 2003, pp. 1-3.

40CH Segment/Driver for Dot Matrix LCD, KS0065B, Samsung Electronics; 12 pages.

Doane, J. William, Khan, Asad; *Cholesteric Liquid Crystals for Flexible Displays*, in *Flexible Flat Panel Displays*, Ed. G. Crawford) John Wiley & Sons, England, Chapter 17 (2005) pp. 331-354.

Doane, J. William, "*Polymer Dispersed Liquid Crystal Displays*", in *Liquid Crystals; Applications & Uses*, Ed. Birendra Bahadur (World Scientific Pub. 1990), Chapter 14, pp. 361-395.

Luo, F.C., "*Active Matrix LC Displays*", in *Liquid Crystals: Applications & Uses*, (ed. B. Bahadur), World Scientific, Singapore, Chapter 15, pp. 397-436.

*Reflective display with photoconductive layer and abistable reflective cholesteric mixture*, Hidefumi Yoshida et al., Journal SID 5/3, 1997, pp. 269-274.

*Photostable Tilted-Perpendicular Alignment of Liquid Crystals for Light Valves*, Anna Lackner et al., Proceedings of the SID, vol. 31/4, 1990, pp. 321-326.

*Transparent Phase Images in Photoactivated Liquid Crystals*, J.S. Margerum et al., Applied Physics Letter, vol. 19, No. 7, Oct. 1, 1971, pp. 216-218.

*Development of a Flexible Electronic Display Using Photographic Technology*, Stanley Stephenson et al., SID 04 Digest, pp. 774-777.

*A Fully Flexible Colour Display*. Peter Slikkerveer et al., SID 04 Digest, pp. 770-773.

*Robust Flexible LCD's with Paintable* Technology, Joost P.A. Vogels et al., SID 04 Digest, pp. 767-769.

*Invited Paper: What is Electronic Paper? The Expectations*, Makoto Omodani, SID 04 Digest, pp. 128-131.

*Effect of Woven Fabric Anisotropy on Drape Behaviour*, Sidabraite, et al., ISSN 1392-1320, Materials Science, vol. 9, No. 1. 2003, pp. 111-115.

*The Characterisation of the Static and Dynamic Drape of Fabrics*, G.K. Stylios et al., J. Text. Inst., 1997, 88 Part 1, No. 4, pp.-465-475.

*Modelling the Fused Panel for a Numerical Simulation of Drape*, Jevsnik et al., Fibers & Textiles in Eastern Europe, Jan./Mar. 2004, vol. 12, No. 1, 0047-52.

*Mechanics of Elastic Performance of Textile Materials*, Chauncey Chu et al., Textile Research Journal, Aug. 1950, pp. 539-548.

*The Dependence of Fabric Drape on Bending and Shear Stiffness*, G.E. Cusick, J. Textile Institute. 36, 11, 1965, pp. T597-T-607.

*Liquid Crystal Dispersions*, Paul S. Drzaic., World Scientific, Series on Liquid Crystals, vol. 1., pp. xi - xv, 1995.

*Plastic VGA Reflective Cholesteric LCDs with Dynamic Drive*, G.M. Podojil et al., SID proceedings, 1998, pp. 51-54.

*Reflective Color Display Using Cholesteric Liquid Crystals*, K. Hashimoto et al., SIC 98 Digest, pp. 897-900.

*Robust Flexible LCDs with Paintable Technology*, J.P.A. Vogels et al., Society for Information Display, 2004 Proceedings. pp. 767-769.

*Black and White Photo-addressable Electronic Paper using Encapsulated Cholester Liquid Crystal and Organic Photoconductor*, T. Kakinuma et al., IDW 2002, pp. 1345-1348.

*Characterization of "Peas in a Pod", a Novel Idea for Electronic Paper*, S. Maeda et al., IDW 2002, pp. 1353-1356.

*Holographic Polymer-Dispersed Liquid Crystals (H-PDLCs)*, T.J. Bunning et al., Annu. Rev. Mater. Sci 2000, 30:83-115, pp. 83-115.

*Reflective display with photoconductive layer and bistable reffective cholesteric mixture*, H. Yoshida, Journal of SID 5/3 1997, pp. 269-274.

*Reflective Multicolor Display Using Cholesteric Liquid Crystals*, M. Okada et al., Proc, SID 97 Digest, pp. 1019-1022.

*Multiple Color High Resolution Reflective Cholesteric Liquid Crystal Display*, D. Davis et al., Proc IDRC (242) 1997.

*Full Color (4096 Colors) Reflective Cholesteric Liquid Crystal Display*, X. Huang et al., Proceedings of Asia Display 98, pp. 883-886 (1998).

Doane, J.W., Liquid Crystals: Applications and Uses, Ed. B. Bahadur, World Scientific Publishers, Ch. 14 (1990).

\* cited by examiner

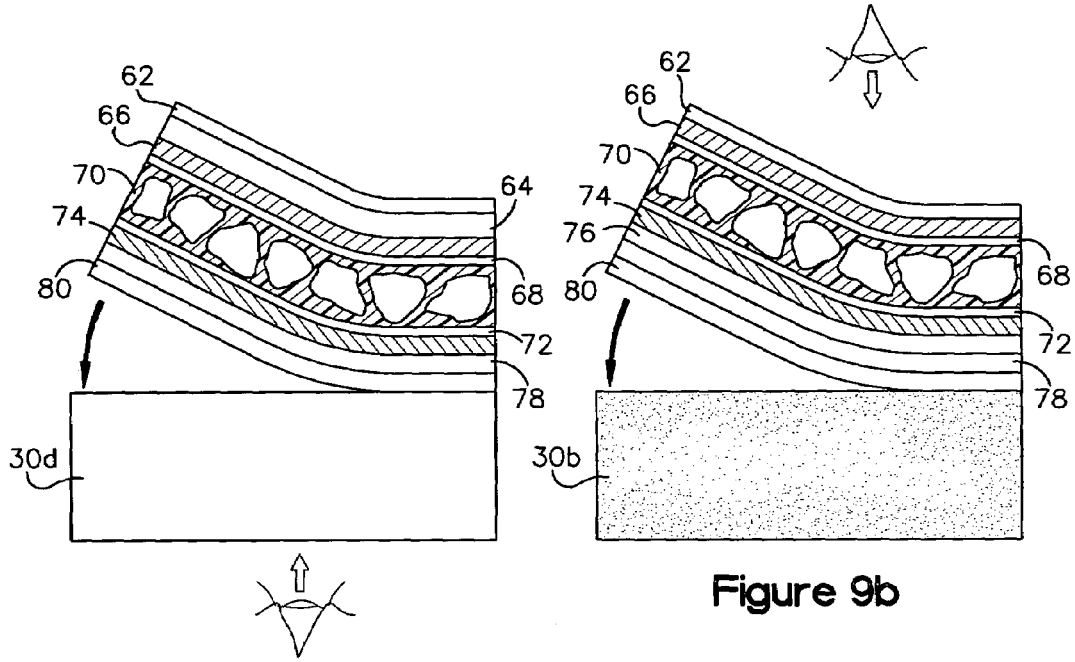
Figure 9a
Figure 9b
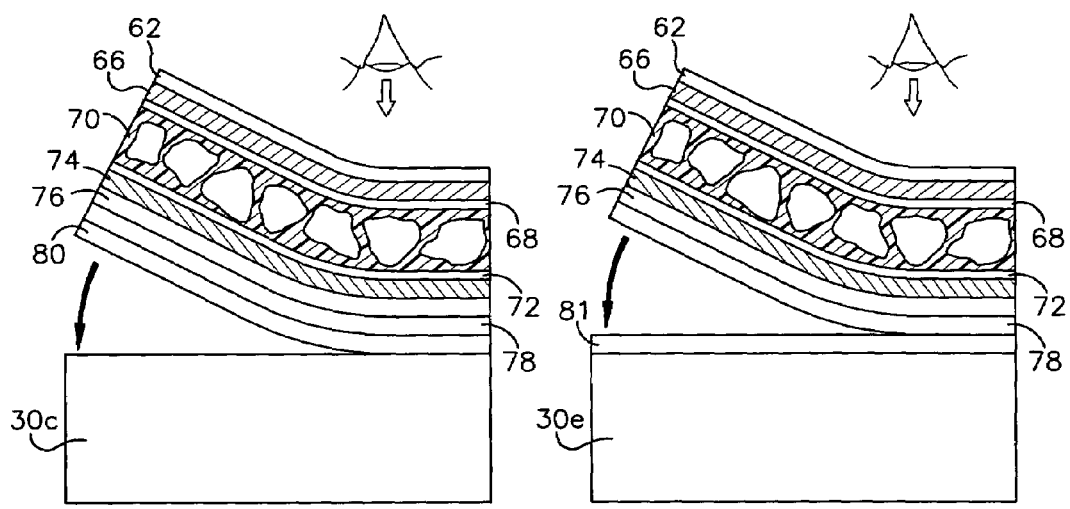
Figure 9c
Figure 9d

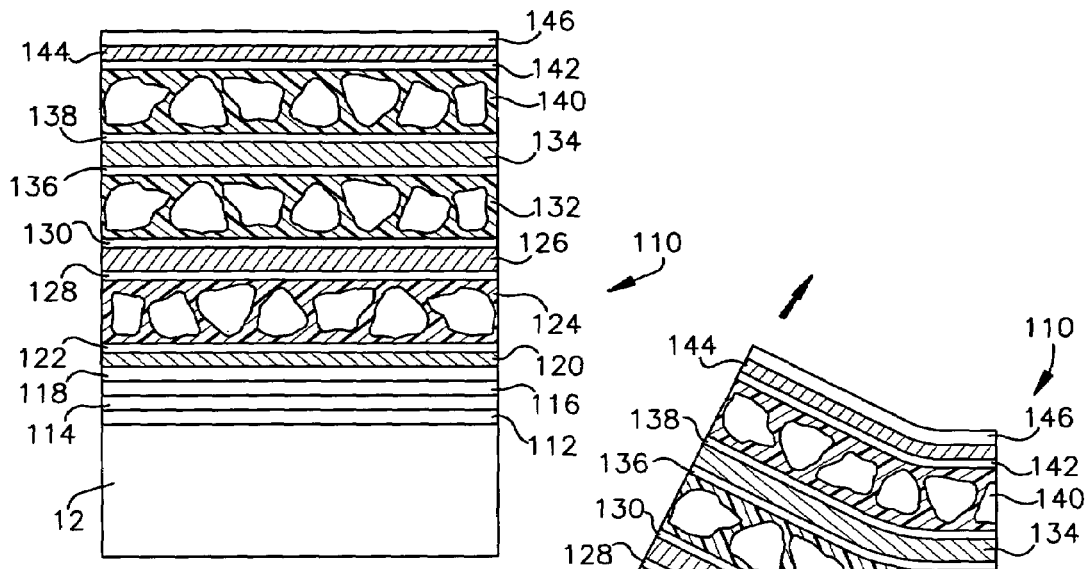
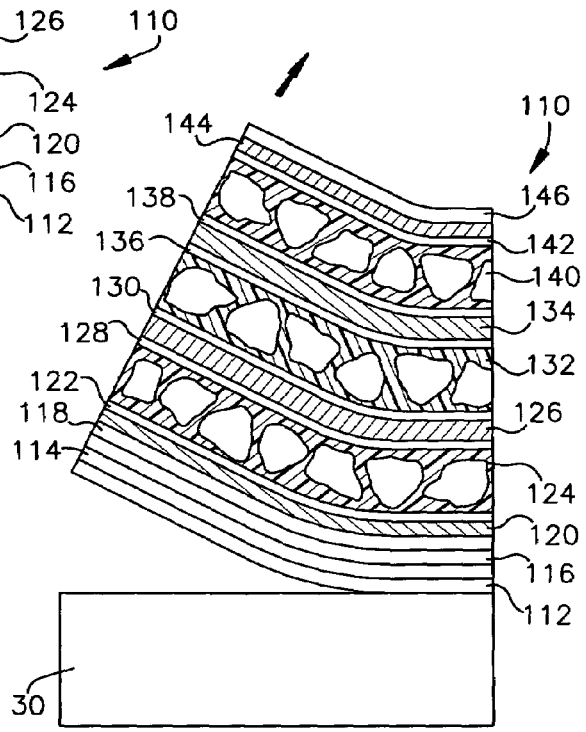
Figure 14
Figure 15a
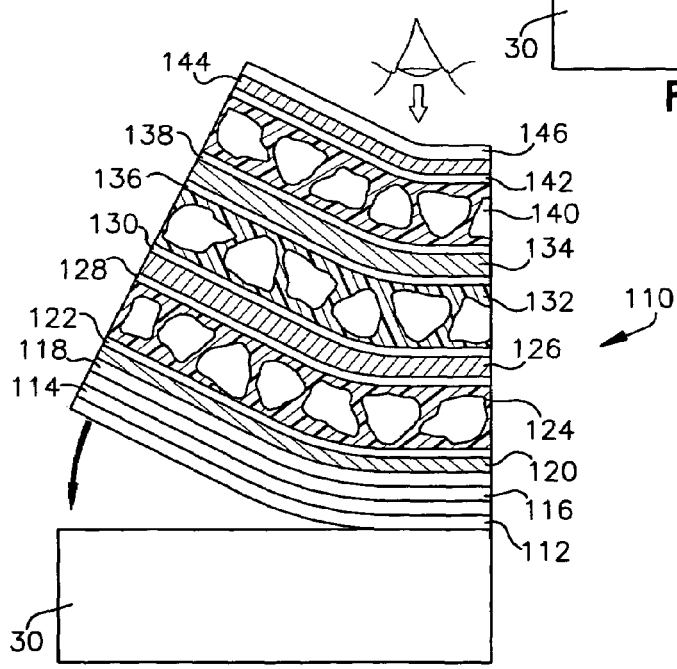
Figure 15b

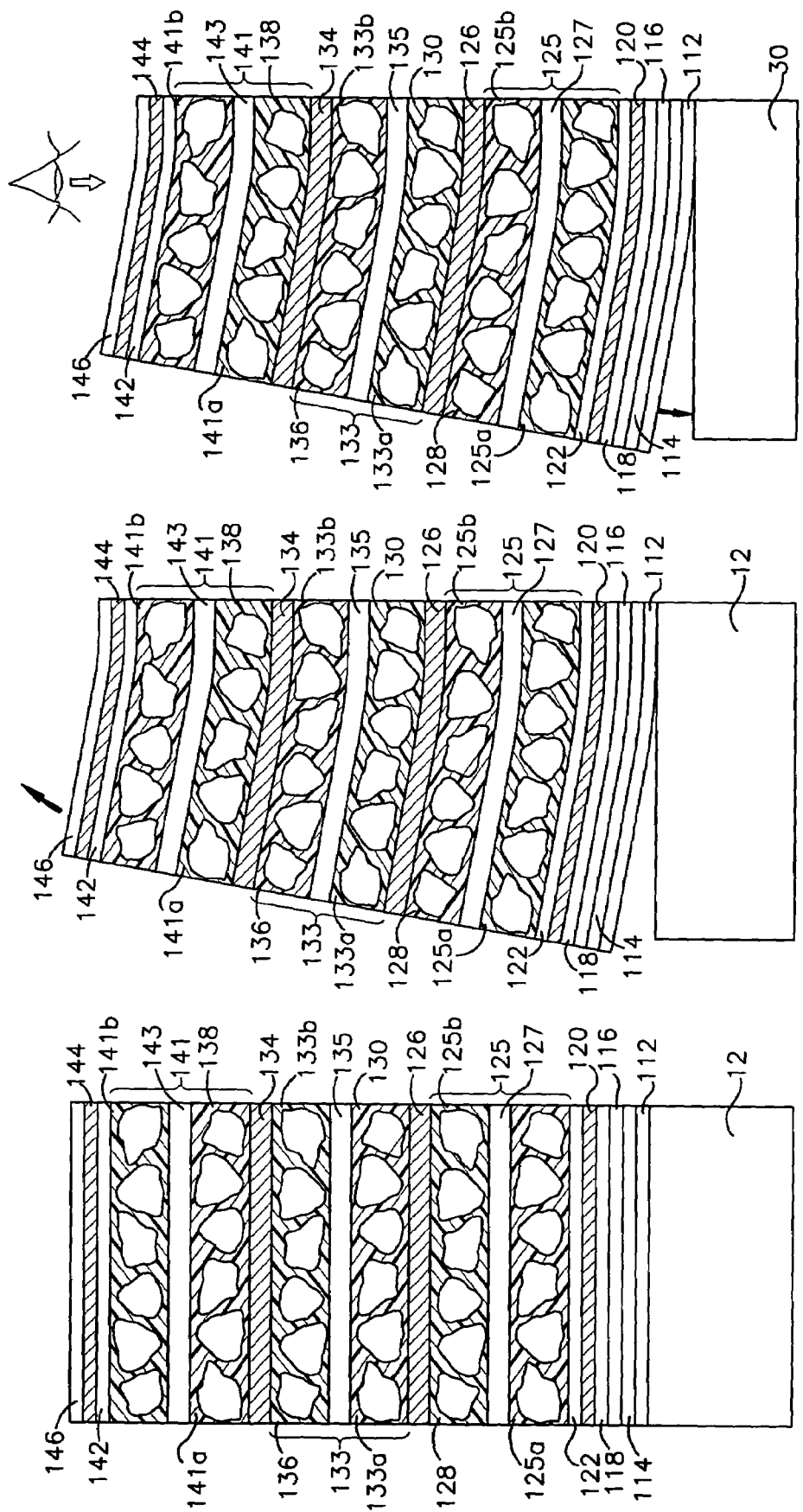

SINGLE SUBSTRATE LIQUID CRYSTAL DISPLAY

II. RELATED APPLICATIONS

This regular application is a continuation of U.S. patent applications Ser. No. 11/006,100, filed Dec. 7, 2004 which is a non-provisional of U.S. Provisional Ser. No. 60/565,586 filed Apr. 27, 2004 and U.S. Provisional Ser. No. 60/539,873 filed Jan. 28, 2004; a continuation-in-part of U.S. patent application Ser. No. 10/782,461, filed Feb. 19, 2004 which is a non-provisional of U.S. Provisional Ser. No. 60/484,337 filed Jul. 2, 2003; and claims the benefit of U.S. provisional patent applications Ser. No. 60/539,873, filed Jan. 28, 2004 and 60/598,163, filed Aug. 2, 2004, now expired, all of which are incorporated herein by reference in their entireties.

I. GOVERNMENT SUPPORT

This application was made in part with United States Government support under cooperative agreement No. DAAB 07-03-C-J406 awarded by the Department of Defense. The government may have certain rights in this invention.

III. FIELD OF THE INVENTION

The present invention relates to the field of liquid crystal displays and, in particular, to the fabrication of such displays.

IV. BACKGROUND OF THE INVENTION

A revolution in the information display technology began in the early 1970s with the invention of the liquid crystal display (LCD). Because the LCD is a flat-panel display of light weight and low power which provides a visual read out that conforms to the small size, weight and battery demands of a handheld electronic device, this display technology enabled a new broad class of handheld and other portable products. Commercially, the LCD first appeared in volume as a digital readout on wrist watches, then on instruments and, later, enabled the laptop computer, personal data assistant and many other digital devices. Today LCD technology is even replacing cathode ray tubes in televisions and PCs.

Nearly every commercial LCD display manufactured and sold today is on glass substrates. Glass offers many features suitable for the manufacture of LCDs. It can be processed at high temperatures, it is rigid and suitably rugged for batch processing methods used in high volume manufacturing, its surface can be made very smooth and uniform over large areas and it has desirable optical properties such as high transparency. There are many applications, however, where glass is far from being the ideal substrate material. Glass substrates cannot be made very flexible and are not very rugged, being unsuitable for web manufacturing and subject to easy breakage. As a result there is a large worldwide effort to develop displays on more flexible and rugged substrates that can not only conform to three-dimensional configurations but which can also be repeatedly flexed. A display is desired that has the flexibility of a thin plastic sheet, paper or fabric, so that it can be draped, rolled up or folded like paper or cloth. This would not only make the display more portable and easier to carry, it would expand its potential applications well beyond those of the typical flat panel information displays known today: A display worn on the sleeve; the back of a bicyclists coat that shows changing direction signals; textile that changes its color or design are but a few examples.

While the ability of an electrically addressable liquid crystal display to be flexible and deform like cloth or paper would be advantageous for any LCD technology, it is especially advantageous in applications suited to cholesteric liquid crystal displays. Cholesteric displays can be made highly reflective such that they can be seen in bright daylight or a dimly lit room without the aid of a heavy and power consuming backlight. Since cholesteric liquid crystals can be made to be bistable they require power only when being addressed, further adding to the power savings associated with such displays. Cholesteric liquid crystalline materials are unique in their optical and electro-optical features. Of principal significance, they can be tailored to Bragg reflect light at a pre-selected wavelength and bandwidth. This feature comes about because these materials posses a helical structure in which the liquid crystal (LC) director twists around a helical axis. The distance over which the director rotates 360° is referred to as the pitch and is denoted by P. The reflection band of a cholesteric liquid crystal is centered at the wavelength, $\lambda_o=0.5(n_e+n_o)P$ and has the bandwidth, $\Delta\lambda=(n_e-n_o)P$ which is usually about 100 nm where ne and no are the extra-ordinary and ordinary refractive indices of the LC, respectively. The reflected light is circularly polarized with the same handedness as the helical structure of the LC. If the incident light is not polarized, it will be decomposed into two circularly polarized components with opposite handedness and one of the components reflected. The cholesteric material can be electrically switched to either one of two stable textures, planar or focal conic, or to a homeotropically aligned state if a suitably high electric field is maintained. In the planar texture the helical axis is oriented perpendicular to the substrate to Bragg reflect light in a selected wavelength band whereas in the focal conic texture it is oriented, on the average, parallel to the substrate so that the material is transparent to all wavelengths except for weak light scattering, negligible on an adjacent dark background. These bistable structures can be electronically switched between each other at rapid rates on the order of milliseconds. Gray scale is also available in that only a portion of a pixel can be switched to the reflective state thereby controlling the reflective intensity.

The bistable cholesteric reflective display technology was introduced in the early 1990's as a low power, sunlight readable technology intended primarily for use on handheld devices. Such portable devices demand long battery lifetimes requiring the display to consume very little power. Cholesteric displays are ideal for this application as the bistability feature avoids the need for refreshing power and high reflectivity avoids the need for power-consuming backlights. These combined features can extend battery life times from hours to months over displays that do not have these features. Reflective displays are also easily read in very bright sunlight where backlit displays are ineffective. Because of the high reflective brightness of a cholesteric display and its exceptional contrast, a cholesteric display can be easily read in a dimly lit room. The wide view angle offered by a cholesteric display allows several persons to see the display image at the same time from different positions. In the case of cholesteric materials possessing positive dielectric anisotropy, modes of operation other than a bistable mode are possible by applying a field to untwist the cholesteric material into a transparent, homeotropic texture. Quick removal of the field transforms the material into the reflective planar texture. The more fundamental aspects of such modern cholesteric displays are disclosed in, for example, U.S. Pat. Nos. 5,437,811 and 5,453,863, incorporated herein by reference.

Bistable cholesteric liquid crystal displays have several important electronic drive features that other bistable reflective technologies do not. Of extreme importance for addressing a matrix display of many pixels is the characteristic of a voltage threshold. A threshold voltage is essential for multiplexing a row/column matrix without the need of an expensive active matrix (transistor at each pixel). Bistability with a voltage threshold allows very high-resolution displays to be produced with low-cost passive matrix technology.

In addition to bistable cholesteric displays with liquid crystalline materials having a positive dielectric anisotropy, it is possible to fabricate a cholesteric display with liquid crystalline materials having a negative dielectric anisotropy as, for example, described in the U.S. Pat. No. 3,680,950 to Haas et al., or U.S. Pat. No. 5,200,845 to Crooker et al., incorporated herein by reference. These "negative materials" like the "positive" materials are chiral nematic liquid crystals that are prepared from nematic materials that have been twisted into a helical molecular arrangement by the addition of chiral compound or collection of chiral compounds. The negative and positive materials are prepared from nematic liquid crystals with either a negative or positive dielectric anisotropy respectively.

Negative type cholesteric displays can operate in a bistable mode where the material is switched into the stable planar (e.g., color reflective) texture with an AC pulse or into the stable focal conic (e.g., transparent) texture with a DC pulse as described by U.S. Pat. No. 3,680,950. There are other modes of operation such as has been disclosed by Crooker where a droplet dispersion of negative cholesteric materials is switched into the planar, color reflective texture with an applied electric field, but relaxes back into a transparent texture when the field is removed.

Some cholesteric materials possess a dielectric anisotropy that can be negative under an applied electric field of one frequency but positive at another frequency. This feature can be used to drive a bistable display using a dual frequency drive scheme as described in U.S. Pat. No. 6,320,563, incorporated herein by reference.

Another important feature of cholesteric materials is that the layers reflecting red, green, and blue (RGB) colors as well as IR night vision can be stacked (layered) on top of each other without optically interfering with each other. This makes maximum use of the display surface for reflection and hence brightness. This feature is not held by traditional displays where the display is broken into pixels of different colors and only one third of the incident light is reflected. Using all available light is important for observing a reflective display in a dimly lit room without a backlight. Gray scale capability allows stacked RGB, high-resolution displays with full-color capability where as many as 4096 colors have been demonstrated. Because a cholesteric display cell does not require polarizers, low cost birefringent plastic substrates such a PET can be used. Other features, such as wide viewing-angles and wide operating temperature ranges as well as fast response times make the cholesteric bistable reflective technology, the technology of choice for many low power applications.

Cholesteric liquid crystals are particularly well suited for flexible substrates. Such cholesteric displays have been reported by Minolta Co. Ltd. and by Kent Displays, Inc. involving two plastic substrates filled with cholesteric liquid crystal materials (Society for Information Display Proceedings, 1998, pp 897–900 and 51–54, respectively). While the substrates themselves are flexible, the assembled displays are much less flexible because of the lamination of two substrates together. Minolta has developed procedures for manufacturing flexible displays with two substrates as seen in U.S. Pat. No. 6,459,467.

Greater flexibility can be achieved if only one substrate is used and the display materials are coated or printed on the substrate. Cholesteric liquid crystals are made suitable for standard coating and printing techniques by forming them into polymer droplet dispersions. As droplet dispersions, the materials are made insensitive to pressure and shear such that an image on a bistable cholesteric display is not readily erased by flexing the substrate. Recently, Stephenson et al., at Kodak fabricated flexible bistable reflective displays with polymer dispersions of cholesteric liquid crystals on a single transparent plastic substrate using photographic methods (U.S. Published Application No. U.S. 2003/0202136 A1 and U.S. Pat. No. 6,788,362 B2). This process involves a sequence of depositions on transparent polyester plastic whereby the end product is a display where the images are viewed through the substrate. Such a process requires substrate materials that are transparent such as a clear plastic sheet.

In view of the foregoing, it is desirable to provide a reflective display that does not require a transparent substrate, making available a broader range of substrate materials such as fabrics made of fibers that can be deformed such as by bending, rolling, draping or folding. These added features offer many advantages and open up many new display applications. Use of flexible and drapable substrates can bring to the market place new displays that have the physical deformability of fabric so that they can be an integral part of clothing and have the feel and appearance of cloth because they can be draped and folded.

V. DISCLOSURE OF THE INVENTION

The present invention features a novel concept in liquid crystal display technology: a display that is a manufactured film. The invention is a display film that is fabricated, lifted off a release liner and then transferred to any desired substrate. The display film may be fabricated by applying a plurality of layers in sequence to include all display components or can be fabricated with some components and later laminated together to complete the display device.

A. Display Film

1. General

The display includes a plurality of coated, printed or laminated layers that form a film that has the elements of a reflective display including liquid crystal material, transparent conducting electrodes, insulation layers to prevent electrical shorts, and protective layers for providing ruggedness. All of the layers are stacked together in a veneered or laminated film forming the framework of the display. The layers are each cast, in sequence or simultaneously, on a release surface (e.g., a release liner), cured or dried and then lifted off of the release liner. This forms a lift-off display element itself without any substrate. Other components may be added such as drive circuitry and connections thereto. The display film may be transferred to some desired substrate in which case it is referred to as a transfer display film. The display film can be transferred onto any desired surface, rough or otherwise, that can contain the interconnecting electrodes to the driving circuitry. The interconnects can be added before or after lamination. Once the display film is connected to electrical drive circuitry it can be electronically updated to produce images from the display.

A substrate as defined herein is a structure that supports components of a liquid crystal display including a liquid crystal layer that is electrically addressed to produce images. The substrate need not be rigid but can be flexible or drapable as disclosed in U.S. application Ser. No. 11/006,100, filed Dec. 7, 2004, which are incorporated herein by reference in their entirety. Glass, metal, polymer, paper and fabric or textile can all be used as substrate materials. The substrate is a generally thin layer, but is often significantly thicker than other components of the display. As defined herein and consistent with U.S. Pat. No. 6,788,362 owned by Kodak, a substrate is a layer that has a thickness of at least 20 microns and, in particular, at least 50 microns. Substrates of liquid crystal displays on the market today can have a thickness of 100 microns or more and substrates such as fabrics can be substantially thicker exceeding 1000 microns. The substrate can be formed of or have various components attached to it such as electrodes, an active matrix backplane, solar cell, photovoltaic device and the like. The present invention is usable in connection with displays employing one, two, or more substrates. A casting layer as defined herein is a film layer of the inventive multilayer film applied on or near the release liner on which other film layers of the display may be printed or coated. The invention may employ various layers that function as casting layers including a preparation layer, electrode layer, adhesive layer, planarization layer, liquid crystal layer, isolation layer and combinations thereof. The multifunctionality of the layers of the inventive display film is discussed in more detail below.

In some cases, it may be desirable for the display film to only contain some of the elements of the display for transfer onto a substrate that already contains other display elements. For example, the transfer display film may contain one layer of printed electrodes, a liquid crystal droplet dispersion layer, and a protective layer that is lifted off of a release liner then transferred onto a substrate having the other conducting electrodes of a passive matrix or an active backplane.

The display film can be electrically addressed by adding suitable electrical interconnects during or after lamination or after removal from the release surface. The electrical interconnects allow drive electronics to be connected to the electrodes of the display film. The display film may be laminated onto a substrate already containing electrodes such as the column or row electrodes of a passive matrix, the pixel electrodes of an active matrix backplane or drive electronics.

While the invention will be described herein primarily in conjunction with the preferred use of cholesteric liquid crystals, any liquid crystal material that can be adapted for use in connection with the foregoing substrates will be suitable in the present invention. Such materials include, by way of example only, nematic, chiral nematic (cholesteric), smectic and ferroelectric smectic liquid crystal materials. They include materials that are bistable and those that are not bistable. They include cholesteric or chiral nematic liquid crystals having positive or negative dielectric anisotropy or a combination of negative and positive with a crossover frequency suitable for dual frequency addressing. They include cholesteric materials having pitch lengths reflecting in the visible spectrum as well as those having pitch lengths reflecting outside the visible spectrum, including ultraviolet and infrared. Preferred liquid crystal materials for use in the present invention are bistable cholesteric (chiral nematic) liquid crystals having positive dielectric anisotropy and planar and focal conic textures that are stable in an absence of an electric field. Especially preferred materials are nematic materials with a high birefringence and dielectric anisotropy with a chiral additive to twist the material to a pitch length to reflect in the visible spectrum such as BL061, BL048 and BL131 from EM Industries of Hawthorne, N.Y.

Cholesteric liquid crystal layers are stackable as discussed in more detail below. Light is inherently reflected by the cholesteric liquid material at preselected wavelengths and bandwidth and is transparent to other wavelengths, allowing the entire area of the display to be used as a reflection surface and making maximum use of available light for brightness. Cholesteric materials can be tuned to reflect at any desired wavelength ($\lambda$) or color and bandwidth ($\Delta\lambda$) for full color displays with stacks of the primary colors red, green and blue (RGB). One can also employ dispersions containing cholesteric liquid crystal-containing droplets in a polymer matrix that reflect red, green and blue light in a single layer.

As will be apparent to those of ordinary skill in the art in view of the instant disclosure, the liquid crystal material will preferably be present in the displays of the invention in the form of liquid crystalline layers each comprised of a liquid crystal dispersion and, most preferably, a cholesteric dispersion. There are many different approaches to the formation of a liquid crystal dispersion, some of which have been used for cholesteric liquid crystals. To form such a liquid crystal layer, the liquid crystal can be microencapsulated or formed into emulsified droplets of liquid crystal, as discussed in more detail below.

As noted, the liquid crystal layer will, in the preferred embodiments, be bounded by conducting electrodes. The electrodes need not be identical. For example, in many embodiments, the electrode on the non-viewing side of the liquid crystal will be black or some other color, while the electrode on the viewing side will be transparent. In other embodiments, the electrodes on both sides of the liquid crystal layer will be transparent. In other embodiments still, an electrode or array of electrodes can be formed integrally with the substrate or the substrate itself can form one of the electrodes. An advantage to being able to use fabric substrates as discussed below, is that it enables greater flexibility in the manner in which the display can be configured.

There are potentially many methods of applying and patterning the conductors. The conductors may be printed in some specified pattern using ink jet, screen or off-set printing. Alternatively, the conducting materials may be sprayed or coated onto the underlying surface (such as the dye layer, protective layer, casting layer or substrate) using a mask, stencil or pretreating the surface to form a chemical mask which allows the electrode material to only adhere to certain areas. In some cases it may be desirable to first lay down a uniform conducting coat and subsequently pattern the layer by chemically or mechanically deactivating regions of conductive material. In fact, it is contemplated that even the substrate itself can be manufactured as the conductor. For example, some flexible plastic materials are manufactured with an indium tin oxide (ITO) coating that may be patterned for use as electrodes. Suitable electrode materials for application to the substrates of the invention will be apparent to those of ordinary skill in the art in view of the instant disclosure and include conducting polymers, carbon nanotubes, metal or carbon conductive inks, ITO and the like. Electrode materials which are self leveling and which can be used in suitable thicknesses to obviate the need for a planarization layer are particularly desirable. Examples of materials for use as conducting electrodes in accordance with the present invention include Agfa conducting polymers ELP-3040, S300, and S2500 available from Agfa-Gevaert N.V., Belgium; Carbon Nanotube materials are available from EiKos, Inc., Franklin Mass. The aforementioned electrodes can be patterned, formed into pixels of varying shapes or sizes, aligned into rows and columns so as to form a passive matrix and so on, all as will be apparent to those of ordinary skill in the art in view of the instant disclosure.

Any means for addressing the liquid crystal known in the art, and preferably adaptable to a display having deformability may be used. In the preferred electrically addressable displays, the means for addressing the liquid crystal will be drive and control electronics operatively linked to the electrodes for application of driving voltages across the liquid crystal material in accordance with any suitable drive scheme known to those of ordinary skill in the art. Examples of suitable drive schemes and electronics include, but are not limited to, the conventional drive scheme disclosed in U.S. Pat. No. 5,644,330 implemented with either bipolar or unipolar drive chips, the dynamic drive scheme disclosed in U.S. Pat. Nos. 5,748,277 or 6,154,190 for faster or lower temperature response, the cumulative drive scheme disclosed in U.S. Pat. No. 6,133,895, for near video response, and the Multiconfiguration Display Driver disclosed in the 10/782,461 patent application, all of which are incorporated herein by reference. Alternatively, the means for addressing can be an optical method whereby the image is written on the display with white light or laser light in a manner such as disclosed in H. Yoshida et al., Journal of the SID, Vol. 5/3, 269–274, (1997), also incorporated herein by reference. In these embodiments, the displays can be fabricated without patterned electrodes. The ledges of substrates where the ends of electrodes are located are left accessible for interconnecting the drive electronics and electrode layers may extend beyond the periphery of the other layers of the display for interconnecting the drive electronics, such as disclosed in U.S. patent application entitled "Stacked Display with Shared Electrode Addressing," Ser. No. PCT/US2005/003141, filed Jan. 28, 2005 (hereinafter "the '141 application"), which is incorporated herein by reference in its entirety.

In a preferred configuration, a high resolution display device in accordance with the invention is configured where the first conducting polymer is printed or otherwise patterned in the form of parallel strips to form rows of parallel conducting electrodes. The droplet dispersion is then coated on top of the rows of conductors, followed by a transparent conductor which is then printed, or otherwise coated and patterned on top of the droplet dispersion in the form of conductive strips (columns) in a direction perpendicular to the rows of conductors that are under the dispersion. In this way, a row and column matrix of electrodes is formed with the cholesteric dispersion in between. Voltage pulses are then multiplexed in such a way to selectively address each of the pixels of the display formed by the intersection of each row and column. When a high-resolution image is addressed on the display film and the voltage removed, the image will be retained indefinitely until readdressed to form another image.

In carrying out the invention, it will often be desirable to employ an electrical insulation layer or layers between the electrodes in order to insulate the conductors from each other and thereby minimize the potential for shorting. Accordingly, for purposes of the instant invention it is desirable to select materials that can be coated, printed, sprayed or otherwise laid down in a layer before and/or after the electro-optically responsive liquid crystal layer. The insulation layer must not significantly detract from the deformability or optics of the display. In accordance with preferred embodiments of the invention, materials such as gelatin or latex are employed. Some particularly preferred insulating materials are polyurethane latex materials such as WITCOBOND W232 (available from Crompton Corporation, CT). Although an insulation layer such as gelatin is optional, experiments show that it leads to a decrease in the switching voltage on the order of 10–15 volts (frequency=250 Hz) when the liquid crystal layer is a cholesteric droplet dispersion. Without being bound by theory, this may be because the gelatin layer is enhancing the dielectric properties of the emulsion through the increase of the dielectric constant.

The use of one or more durable protective coatings (e.g., top coats) obviates the need to use a substrate, thereby enhancing both the flexibility and durability of the display film. Desirable protective coatings will be materials that will provide a tough, scratch and wear-resistant coating over at least a portion, and preferably all, of the uppermost surface of the display, but do not materially interfere with the optics of the system. Likewise, the most desirable protective coating materials will maintain the deformability of the system. Those of ordinary skill in the art will be able to select suitable protective coating materials in view of the instant disclosure; preferred materials include acrylic or silicone paints, UV curable adhesives, PVA, latex materials and the like. Because some protective coatings will include solvents or other components which may be harmful to the electrodes or other elements of the display, in carrying out the invention it may be desirable to select an isolation layer material that will protect the other display elements from harmful components of the adjacent coat. The laminated display film of the present invention includes within its scope various additional layers in different sequences, numbers and locations throughout the display.

As will be apparent to those of ordinary skill in the art, displays according to the invention can be formed in many different configurations using some or all of the foregoing component layers. For example, the display materials may only appear on one side of a fabric substrate leaving the other side untouched, or portions of the display may be partially imbibed into and integrally formed with the substrate. The minimum requirements for the electrically addressable transfer display films of the invention are at least one liquid crystal layer and at least one adjacent conducting electrode layer; the liquid crystal layer is sandwiched between the film electrode layer and another conducting electrode layer that is a component of the display film or a conductive electrode layer that is applied to, on or imbibed into the substrate. Beyond this, there are multiple possible configurations and combinations which can effectively take advantage of the flexibility and/or drapability of the substrates according to the invention as will be apparent to those of ordinary skill in the art in view of the present disclosure.

The fabrication of the inventive display film involves printing, coating or other deposition means to form the liquid crystal material, display electrodes as well as any insulating, isolation or other coatings. These layers in a preferred embodiment are built on a casting layer that is removed from the release surface once the multi-layered laminate has been dried or cured. In view of the instant disclosure those of ordinary skill in the art will be able to select and employ suitable coating, printing and deposition techniques including, but not limited to, air brushing, ink jet, spin coating and spray printing, optionally in conjunction with various masks or stencils known in the art, screen printing, photolithography, chemical masking and so on, depending upon the particular layers, substrates or display elements used. It is contemplated that any contact or non-contact method of applying coatings and conductors known in the art will be suitable for use in accordance with the instant disclosure.

2. Liquid Crystal Dispersions

An encapsulation process involves emulsification of a cholesteric liquid crystal in water with a waterborne polymer. Encapsulation of cholesteric liquid crystals by emulsification was practiced even before the invention of bistable cholesteric displays. As early as 1970, cholesteric materials were emulsified for making cholesteric thermal and electrical responsive coatings as discussed in U.S. Pat. No. 3,600,060, incorporated herein by reference. More recently, emulsification methods have been refined by Stevenson et al., at Kodak to make cholesteric droplets that are very uniform in size, as disclosed in U.S. Pat. No. 6,423,368 B1, incorporated herein by reference. The most common emulsification procedure basically involves a liquid crystal being dispersed in an aqueous bath containing a water-soluble binder material such as deionized gelatin, polyvinyl alcohol (PVA) or latex. Water acts as a solvent and dissolves the polymer to form a viscous solution. This aqueous solution does not dissolve the liquid crystal, and they phase separate. When a propeller blade at a sufficiently high speed stirs this system, micron size liquid crystal droplets are formed. Smaller liquid crystal droplets form at higher stirring speeds as disclosed in P. Drzaic, *Liquid Crystal Dispersions*, World Scientific Publishing Co., Singapore (1995), incorporated by reference. The molecular weight of the water-soluble polymer is also a factor affecting the droplet size. After the droplets are formed, the emulsion is coated on an underlying layer or substrate and the water is allowed to evaporate. There are many different emulsification procedures. In preferred embodiments, one or more of PVA, gelatin and latex, preferably urethane based latex, are used to form the binder. The emulsification method has the advantage that the droplet dispersions may contain a very high percentage of cholesteric material. Those of ordinary skill in the art will be able to select suitable materials and methods for providing emulsified liquid crystal droplet layers for use in accordance with the present invention in view of the instant disclosure.

Microencapsulation is a yet another process for preparing droplet dispersions as seen, for example, in U.S. Pat. No. 6,271,898, incorporated herein by reference. While this procedure can be more complex and material sensitive, it can nonetheless provide more control over droplet size and molecular anchoring conditions for the cholesteric liquid crystal. In this case the liquid crystal droplet is coated by a shell isolating it from the binder. It may be possible to process the droplet particles in the form of a dry powder which is later dispersed in a suitable binder for coating. Other types of dispersions may be a regular array of polymer pockets filled with liquid crystalline material and sealed on the top by a phase separation process as disclosed in, for example, D. J. Broer et al, Society for Information Display 2004 Proceedings, pp 767.

3. Multiple Liquid Crystal Layers

The inventive display film can be fabricated by coating two or more cholesteric liquid crystal dispersion layers over one another. One or more conducting electrode layers are located between adjacent liquid crystal layers. A full color display can be made by stacking three liquid crystal layers having pitch lengths that reflect red, green and blue light, respectively. With only one electrode layer between each liquid crystal layer, the display is electronically addressed by a shared electrode addressing scheme possible with bistable cholesteric dispersions as disclosed in the '141 application. An infrared reflective display is possible where at least one of the droplet dispersion layers reflects in the infrared, such as might be used for night vision purposes. For color, enhanced brightness or infrared applications such as those described in U.S. Patent No. 6,654,080, incorporated herein by reference, stacks of coatings arranged as disclosed therein can be employed in accordance with the instant invention. A multiple color display can also be prepared with a single dispersion layer wherein each pixel is divided into different primary colors such as red, green and blue, for additive color mixing. The patterned colors can be achieved as described, for example, in U.S. Pat. No. 5,668,614, incorporated herein by reference.

In order to increase brightness of a cholesteric liquid crystal layer of the display, both the left and right circular components of the incident light should be reflected. There are two methods to accomplish this: to layer a cholesteric material of one handedness on top of the other or to insert a half wave plate in between two layers of the same handedness. One aspect of the invention coats subayers of cholesteric materials of different handedness (left hand-LH and right hand-RH) on top of one another in the formation of the liquid crystal layer reflecting a certain wavelength of electromagnetic radiation. The coatings are immiscible so that the droplet structures of the two different materials are not destroyed in the coating or drying process. The encapsulant surrounding the droplets is impermeable to the cholesteric material to limit molecular diffusion in that cholesteric material of one handedness dissolving into the other will destroy its desired optical properties. An optional barrier layer is disposed between LC sublayers. In the case of the full color display, each of the red, green and blue reflecting liquid crystal layers may be composed of LH/RH sublayers to increase brightness.

4. Compositions and Layer Thicknesses

The layers of the multilayer film can have various compositions as would be apparent to those skilled in the art in view of this disclosure. By way of example only, and without limiting the present invention, suitable compositions of the various layers of the multilayer film include solvent-based, water-based and water-borne polymers for the planarization layer; solvent-based, water-based and water-borne polymers and thin plastic sheets, including PET, PC, PEN for the casting layer; water-borne polymers, including polyurethane and acrylic latexes, water-soluble polymers, including gelatin, polyvinyl alcohol, and polyvinyl acetate for binder material which surrounds the liquid crystal droplets; cross-linking agents, including materials based on aziridine, lactic acid chelates, formaldehyde, glutaradehyde as additives to binder material to control binder properties and various surfactants, including surfactants based on silicone polyether copolymers, alkylaryl polyethers, alcohol ethoxylates (Triton X-100, Triton CF-10, DC 5098, alkanol) as additives to binder material to control binder properties.

The layers of the multilayer film can have various magnitudes of thickness and relative thicknesses to one another. Those skilled in the art will appreciate in view of this disclosure various layer thicknesses that may be suitable for use in the present invention. By way of example only, and without limiting the present invention, suitable thicknesses of the casting layer are less than 20 microns and, in particular, in a range of 5 to 15 microns. Suitable thicknesses of the adhesive layer are in a range of 10 microns to 75 microns and, in particular, less than 25 microns. Suitable thicknesses of the electrode layer are governed, for example, by the transparency and resistivity of the conducting polymer. Normally the desired resistivity is less that 1000 Ohms per square and transparencies above 90% are desired. This typically results in a thickness less than 1.0 micron for the electrode layer.

B. Transfer Display Film

1. General

Liquid crystal displays sold in the marketplace today are fabricated by building the display on a substrate that forms a part of the display. Conventional displays include two substrates that sandwich the liquid crystal material in between. Lines of electrodes may be patterned onto the substrates. The substrates may include treatment such as rubbing of chemicals applied to the substrates to affect the alignment of the liquid crystals. In contrast, the inventive lift off (e.g., transfer) display film includes some or all of the components of a typical liquid crystal display, but is built up on a release liner during fabrication and a substrate need not be incorporated as an element of the display film. The display film is then lifted off the release liner and transferred onto a substrate. The transfer display film can be made with some of the components that make up a complete display, for example, with one or two electrode layers on either side of the liquid crystal. For example, a transfer display film containing a single electrode layer can be transferred to a substrate having the other electrode layer on it and the drive electronics can be added when the transfer film is laminated onto the substrate. On the other hand, the transfer display film may include all elements of an operable display except for some elements of the drive electronics, and then transferred onto a substrate containing drive electronics. Those skilled in the art will appreciate that these and other variations in the number and types of components and when they are added during the steps of the fabrication process, fall within the scope of the present invention.

The transfer display film may include a layer that facilitates binding of the transfer film to the substrate. This can include an adhesion layer as a part of the transfer display film. Instead of or in addition to the adhesion layer, the transfer display film may include a preparation layer that enables binding to an adhesion layer. The preparation layer may match indices of refraction of adjacent layers. If the adhesion layer is formed on the substrate to which the transfer display film will be transferred, the transfer display film may include a preparation layer that accommodates the solvent of the substrate adhesion layer.

A transfer display film as described above has the following advantages. It can be laminated on a rough surface such as cloth, paper or other uncommon substrates for commercially available liquid crystal displays. The lamination process will not alter the uniform spacing between the electrodes. The substrate on which the film will be laminated can be manufactured independently of the display film, making available a wide variety of materials or shapes not available for substrate use before. The manufacturing facility of the display film can be simplified and of lower cost since it does not have to be specific to the substrate. The transfer display film can be laminated on substrates that otherwise could not contain a display in that they cannot be processed in a clean room environment. The display film can be transferred onto a backplane that contains a portion of the display elements and/or drive electronics such as, for example, an active matrix backplane or the orthogonal row or column conductive lines of a passively driven display.

An advantage of the invention is that the manufacturing process is independent of the substrate, unlike any display manufacturing process being currently used. Another advantage is that the display film may be transferred onto any of a wide variety of substrates, such as cloth, which was not possible before. The substrate may possess a rough surface. However, the film can be laminated so that the electrode spacing is maintained and the display is functional so long as the surface does not rupture the display film. The display film can be made pliable and rugged. The inventive display film can be stretched or rolled up, is suitable for lamination on plastic, woven fabric material, etc. or may even be specifically designed for lamination on an active matrix substrate.

Cholesteric materials are particularly well suited for a display film in that they can be made as droplet dispersions that can be coated or printed and are self-sealing to contain the cholesteric liquid crystal in the film. Cholesteric liquid crystal materials may be bistable, possessing planar and focal conic textures that are stable without application of an electric field. Once an image is formed, no electric field is required to maintain the image. That is to say, a voltage below threshold voltage can be applied to the liquid crystal layer without changing its planar or focal conic textures. The image will remain indefinitely until it is updated by additional voltage pulses applied to the pixels above the threshold voltage. Cholesteric materials are field driven, as opposed to current driven, requiring near negligible current to change their optical state. As such, the conducting electrodes can be composed of such materials as conducting polymer or carbon nanotubes that can be printed or coated into a film, which generally possess low transparency/conductivity ratios. Other droplet dispersion systems such as nematics and ferroelectrics also offer the possibility for use as a transfer film.

2. Drapable Liquid Crystal Transfer Display Film

One aspect of the display film of the present invention is that the lift-off film itself is flexible and can be drapable. Also, the lift-off film can be transferred onto a drapable substrate. This invention involves a substantial advance in addressable liquid crystal displays wherein, by forming the displays as a drapable film or combining the transfer display film with a drapable substrate, the display itself is drapable. Such substrates include textiles or fabrics made of natural or man-made fibers such as cloth or paper, as well as non-fibrous materials such as flexible or even drapable thin polymeric sheets or films. Advantageously, the substrate need not be transparent. With deformable substrates, cholesteric or other liquid crystal displays are made flexible, rugged and can even be sewn into or onto clothing to provide a wearable display. In fact, the display itself can form the material used to make the clothing or other fabric construct. A display with the drapability of cloth provides a new dimension to display technology enabling display applications that were not previously possible. Such displays can conform to three dimensional structures or flex and fold with a garment or other fabric construct containing the display. To this end, the displays according to the invention are operatively deformable, meaning that they will function even though they are or have been deformed. In preferred applications, the displays according to the invention will be operatively drapable such that they can have folds and possess a measurable drape coefficient.

The formability of the display film and of fabric or other drapable substrate material onto which the display film is transferred, can be defined as its ability to re-form from a two-dimensional shape to a simple or complex three-dimensional shape. The drape coefficient is used to describe the degree of 3-D deformation when the fabric specimen is draped over a drapemeter as described, for example, in the publication: "Effect of Woven Fabric Anisotropy on Drape Behavior," *ISSN* 1392-1320, *Materials Science (Medziago-tyra)*, Vol. 9, No. 1, pp. 111–115 (2003) by V. Sidabraitre and V. Masteikaite, or "Modeling the Fused Panel for a Numerical Simulation of Drape" *Fibers and Textiles*, Vol. 12, pages 47–52 (2004), by S. Jevsnik and J. Gersak, incorporated herein by reference. Drapability is a phenomenon that occurs when a material such as a curtain, flag, table cloth or flared skirt hangs from an object. The drape coefficient, DC, describes any deformation between draped and undraped material. In terms of percentage, it is described by the ratio: $DC=100(S_P-R_1^2)/(R_2^2-R_1^2)$ were $R_2$ is the radius of a circular cut of non-deformed fabric; $R_1$, the radius of a horizontal disc holding the fabric, and $S_P$ the projected area of the draped specimen, including the part covered by the horizontal disc. The value of DC varies between zero and 100%. Since the value of DC can depend on the values selected for $R_1$ and $R_2$ of the drapemeter, we follow others in taking $R_1=9$ cm and $R_2=15$ cm. The larger the value of the drape coefficient, the stiffer the fabric and more difficult to reform. Alternatively, the lower the value of DC, the easier to reform and adapt to shapes. Some examples of desirable fabric substrate materials include silk, cotton, nylon, rayon, polyester, Kevlar, or similar materials made of fibrous material formed by woven and non-woven means having the deformability of cloth. Some examples of fabrics having the desired drapability are shown in Table I, which shows measured values of the drape coefficient, DC, for various fabric materials made with $R_2=15$ cm and $R_1=9$ cm. The data on the materials identified with an asterisk (*) were obtained from the publication "The Dependence of Fabric Drape on Bending and Shear Stiffness, *J. Textile Institute*, Vol. 56, pp. 596–606 (1965) by G. E. Cusick, incorporated herein by reference. The other materials were obtained from Jo-Ann Fabrics, Cuyahoga Falls, Ohio and Hudson, Ohio, and the DC values measured.

TABLE I

| Fabric | Weight (g/m²) | Thickness (mm) | DC(%) |
| --- | --- | --- | --- |
| *Woven dress fabric, spun viscose rayon | 231 | 0.36 | 67.8 |
| *Woven dress fabrics, spun viscose rayon | 142 | 0.41 | 36.9 |
| *Plain woven 1.5 den spun viscose rayon | 196 | 0.45 | 32.6 |
| *Plain woven continuous-filament acetate and rayon | 226 | 0.46 | 24.7 |
| *Woven dress fabric cotton | 115 | 0.20 | 75.5 |
| *Woven dress fabric cotton | 105 | 0.31 | 97.2 |
| *Plain woven, continuous-filament polyester fiber | 96 | 0.20 | 49.9 |
| Polyester from Jo-Ann Fabrics | 186 | 0.3 | 14 |
| Polyester-65%, nylon 35% from Jo-Ann Fabrics | 116 | 0.17 | 49 |
| Polyester, satin from Jo-Ann Fabrics | 128 | 0.21 | 52 |

As will be apparent to those of ordinary skill in the art in view of the present disclosure, any deformable material having the desired flexibility or drapability and capable of supporting the display elements as disclosed herein will be suitable for use in the invention. In some preferred embodiments, the fabric substrate may be a composite or, more preferably, a fiber reinforced composite such as cotton and polyisoprene. An example of such composites is a raincoat where the cotton provides the feel and drapability of cloth and polyisoprene provides water resistance. Another example is rayon and neoprene used as a light shield against laser light such as that obtained by Thorlabs, Inc. (NJ) catalog # BK5. Composites can be useful substrate materials for many of the preferred displays of the invention.

In many preferred embodiments, the substrate material is non-transparent. While black is a preferred color, other colors such as dark blue, green or some other color may be used to additively mix with the reflective color of the cholesteric liquid crystal to provide the desired color of text or other image addressed on the display. The substrate material itself may be substantially clear or transparent but the substrate made non-transparent by adding a black coating or dye to render it opaque, translucent or non-transparent as required for the background of the display. The image on a reflective cholesteric display is viewed against the background. It is therefore important that the background absorb unwanted light and not provide light that competes with or washes out light reflected from the cholesteric liquid crystal. Most fabrics are non-transparent. There are many examples of deformable sheet materials that are not made of fibers such as polymer films. If the sheet is thin enough, these films may also be drapable. An example of a polymer film that is non-transparent and very drapable is black static cling polyvinyl chloride sheet material from Graphix Plastics, Cleveland Ohio. Other examples of non-fibrous and drapable plastic sheets having the desired drapability are shown in Table II, which shows measured values of the drape coefficient, DC, for various non-fibrous sheet materials ($R_1=9$ cm and $R_2=15$ cm). The value of the drape coefficient was measured by photographing from above, the drape of the specimen of radius $R_2$ draped over a pedestal of radius $R_1$ under a weighed disk of the same radius. The areas of the projected image of the drape in the circle of radius $R_2$ were obtained from the digital photograph. In all cases, the drape showed the characteristic folds.

TABLE II

| Sheet Material | Weight (g/m²) | Thickness (mm) | DC(%) |
| --- | --- | --- | --- |
| Black polyvinyl chloride from Graphix Plastics | 189 | 0.15 | 52 |
| Clear DuraLar (general purpose polyester) | 18.1 | 0.013 | 68 |
| Clear DuraLar (general purposed polyester) | 32.9 | 0.025 | 95 |
| Clear DuraLar (general purpose polyester) | 73.7 | 0.050 | 98 |

Sheet materials which are too thick do not exhibit drape but may bend or be flexed about one axis such as, for example, being rolled up. An example is 5 mil (0.125 mm thick) Clear DuraLar (polyester) or 5 mil thick Teijin Limited polycarbonate ITO coated foil (SS120-B30). Such 2-D deformation materials can be rolled up but do not reflect the nature of drape. It should be noted, however, that these and similar films will be suitable for certain embodiments of the invention where drapability is not required. For example, where only a flexible display is desired, such films can be rendered black or otherwise non-transparent for use as a substrate by coating it with a black Krylon paint.

It will be apparent from the following that while advantages of the invention are realized by the presentation of a deformable liquid crystal display, a principal contributor to the realization of this advantage is the provision of an electrically addressable liquid crystal display on a single substrate. Electrically addressable displays on the market today employ at least two substrates which, as noted above, are generally rigid, with the liquid crystal sandwiched between them. These displays are, in general, manufactured by batch processing methods.

In accordance with preferred embodiments of the present invention, a display film is fabricated by a sequence of layers on a release liner by coating, printing or lamination techniques suitable for the web processing methods necessary for low cost, high volume production. Fundamentally, these layers consist of a first conductive layer followed by a layer of an electrically responsive droplet dispersion such as a polymer dispersed cholesteric liquid crystal, followed next by a transparent conductive layer. Insulation coatings are often needed between the cholesteric dispersion and electrodes to avoid electrical shorts between the electrodes. A durable protective layer is coated to finalize construction of the display film. In some cases an isolation layer is required between some of the coatings to avoid damage by subsequent coatings, such as may be caused by a chemical reaction between coating solvents or other components. Likewise, preparation coatings between various layers may be necessary to promote wetting and adhesion of the subsequent coat. In some embodiments, the coatings often serve multiple functions, such as where the first conductive coat may also serve as a preparation coat to smooth the surface.

As noted, the liquid crystal layer will, in the preferred embodiments, be bounded by conducting electrodes. The electrodes need not be identical. For example, in many embodiments, the electrode on the non-viewing side of the liquid crystal will be black or some other color, while the electrode on the view side will be transparent. In other embodiments, the electrodes on both sides of the liquid crystal layer will be transparent. In other embodiments still, an electrode or array of electrodes can be formed integrally with the substrate or the substrate itself can form one of the electrodes. The multilayer film is then lifted off the release liner and transferred to a flexible substrate.

Transferring the film onto rough textiles, other rough fabrics or other rough substrates or layers could employ a planarization coating to at least partially smooth the surface. This may be followed by a preparation coating or sequence of such coatings to further smooth the surface of the fabric as well as adjust its color, resistivity, wetting and adhesive properties with respect to the first conductive layer. However, it is believed that the inventive display film can be applied to all but the roughest surfaces without the need for planarization of the surface. The inventive transfer film exhibits good durability and toughness during the fabrication process and maintains the gap thickness of the liquid crystal layer between adjacent electrode layers. Typically, only those surfaces that are so rough that they could puncture the liquid crystal layer, would include a planarization layer on the rough surface.

Planarization of rough surfaces can be conducted in various ways as disclosed in the U.S. application Ser. Nos. 60/565,586 and 11/006,100. A preferred manner of planarizing a surface in accordance with the invention is the addition of a planarization layer. A planarization layer is a coating of material which, when applied to the rough substrate or other rough layer such as to a rough casting layer, will tend to smooth out the most dramatic fluctuations in the rough surface so as to provide a generally smooth, though not necessarily flat, surface onto which to deposit the next layer. Preferred materials for use as a planarization layer in accordance with the invention are gelatin, neoprene and latex materials such NeoRez R967 available from NeoResins, Mass. The planarization layer also may be a polymeric sheet such as PET.

As will be apparent to those of ordinary skill in the art, display films according to the invention can be formed in many different configurations using some or all of the foregoing component layers. For example, the display film may only appear on one side of the fabric leaving the other side untouched, or the display film may be partially imbibed into and integrally formed with the flexible substrate, as by transferring the display film onto a heated fabric substrate.

3. Other Substrates

A self-powered display may be achieved by using a solar panel as the substrate or a component of the substrate whereby light that is not reflected by the cholesteric material can be absorbed in the solar panel for conversion into electrical power for powering the display.

It is also conceived that an active matrix substrate could be employed to create an actively driven cholesteric display, whereby the various display elements of the transfer film are laminated onto the active backplane.

Further still, an optically addressed display is achieved by placing a photoconductive sheet over the lower conducting electrode. With a continuous voltage applied to the electrodes, light impinging the display film will locally alter the resistivity of the photoconductor and drive the display film. Such a display construction avoids the need of patterning the electrodes. The display can include an upper and lower unpatterned electrode. The display can be addressed by an image suitably focused on the film, or written with a scanned laser beam as described in the publication "Reflective Display with Photoconductive Layer and Bistable Reflective Cholesteric Mixture" *Journal of the SID*, Vol. 5/3, pages 269–274 (1997) by J. Yoshida et al., incorporated herein by reference. Of course, other veneered stacks are possible depending on desired display.

VI. SUMMARY OF THE INVENTION

In general, one embodiment of the present invention features a liquid crystal display including a substrate and a multi-layer stack of components of the display supported on the substrate, the display including only one substrate. The components of the display include at least two stacked liquid crystal dispersion layers. Each of the dispersion layers comprises regions of liquid crystal material dispersed in a polymer matrix material. Also included are a plurality of electrically conductive layers. An intermediate electrically conductive layer is disposed between adjacent dispersion layers. Further, drive electronics are adapted to electrically address pixels of the liquid crystal material between adjacent electrically conductive layers effective to produce images from the display.

Another aspect of the invention features a liquid crystal display including a substrate and a multi-layer stack of components of the display supported on the substrate, the display including only one substrate. The components of the display include a plurality of liquid crystal dispersion layers including: a first liquid crystal dispersion layer stacked over the substrate and a second liquid crystal dispersion layer stacked over the first liquid crystal dispersion layer. The first dispersion layer and the second dispersion layer comprise regions of cholesteric liquid crystal material dispersed in a polymer matrix material. There are multiple electrically conductive layers including: a first electrically conductive layer stacked between the first dispersion layer and the substrate, an intermediate electrically conductive layer stacked between the first dispersion layer and the second dispersion layer, and a second electrically conductive layer stacked over the second dispersion layer. A protective polymer film layer is used. The substrate forms one outer surface of the display and the protective film layer forms another outer surface of the display. Drive electronics are adapted to electrically address the liquid crystal material of the first dispersion layer and the second dispersion layer between adjacent electrically conductive layers effective to produce images from the display.

Another embodiment of the invention features a liquid crystal display including a substrate and a multi-layer stack of components of the display supported on the substrate. The display includes only one substrate and has a side that is proximal to the substrate and a side that is distal from the substrate. The display is constructed and arranged to be viewed from the distal side and adapted to absorb light near the proximal side. The components of the display sequentially comprise a first electrically conductive layer stacked over the substrate near the proximal side of the display. A liquid crystal dispersion layer comprises regions of cholesteric liquid crystal material dispersed in a polymer matrix stacked over the first electrically conductive layer. A second optically transparent electrically conductive layer is stacked over the liquid crystal dispersion layer. Drive electronics are adapted to electrically address pixels of the liquid crystal material effective to produce images from the display.

A further aspect of the invention features a liquid crystal display including substrate and a multi-layer stack of components of the display supported on the substrate. The components are formed by printing or coating as films. The display includes only one substrate and has a side that is proximal to the substrate and a side that is distal from the substrate. The display is constructed and arranged to be viewed from the distal side and adapted to absorb light near the proximal side. The components of the display sequentially include a first electrically conductive layer stacked over the substrate near the proximal side of the display. The first electrically conductive layer includes first parallel lines of electrodes extending in a first direction. A liquid crystal dispersion layer includes regions of cholesteric liquid crystal material dispersed in a polymer matrix stacked over the first electrically conductive layer. A second optically transparent electrically conductive layer stacked over the dispersion layer includes second parallel lines of transparent electrodes extending in a second direction that is orthogonal to the first direction. An optically transparent polymer film layer forms an outermost portion of the distal side of the display. Drive electronics are adapted to electrically address pixels of the liquid crystal material effective to produce images from the display.

Many additional features, advantages and a fuller understanding of the invention will be had from the accompanying drawings and the detailed description that follows. It should be understood that the above Summary of the Invention describes the invention in broad terms while the following Detailed Description describes the invention more narrowly and presents preferred embodiments that should not be construed as necessary limitations of the broad invention as defined in the claims.

VII. BRIEF DESCRIPTION OF THE DRAWINGS

FIGS. 3 and 4a are side cross-sectional views of the fabrication of another aspect of a display film constructed in accordance with the invention and FIG. 4b is a side cross-sectional view of the display film of FIG. 4a transferred onto a substrate, while

FIGS. 7 and 8 are side cross-sectional views of the fabrication of another aspect of a display film constructed in accordance with the invention and FIG. 9a–9c are side cross-sectional views of the display film of FIG. 8 transferred onto various substrates, while FIG. 9d is a side cross-sectional view showing a variation of the display of FIG. 8;

FIGS. 10 and 11a are side cross-sectional views of the fabrication of another aspect of a display film constructed in accordance with the invention and FIG. 11b is a side cross-sectional view of the display film of FIG. 11a transferred onto a substrate, while

FIGS. 14 and 15a are side cross-sectional views of the fabrication of another aspect of a display film constructed in accordance with the invention and FIG. 15b is a side cross-sectional view of the display film of FIG. 15a transferred onto a substrate;

FIGS. 16 and 17a are side cross-sectional views of the fabrication of another aspect of a display film constructed in accordance with the invention and FIG. 17b is a side cross-sectional view of the display film of FIG. 17a transferred onto a substrate, while

Figure 26:
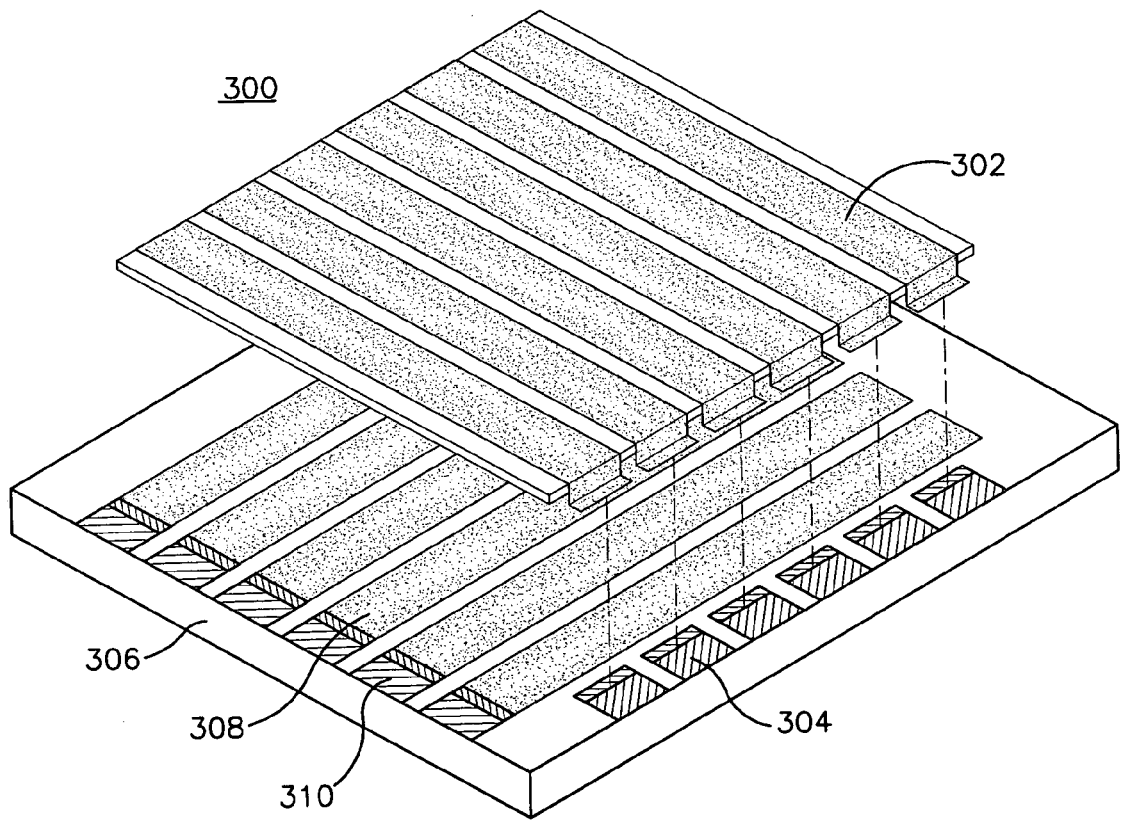
Figure 24:
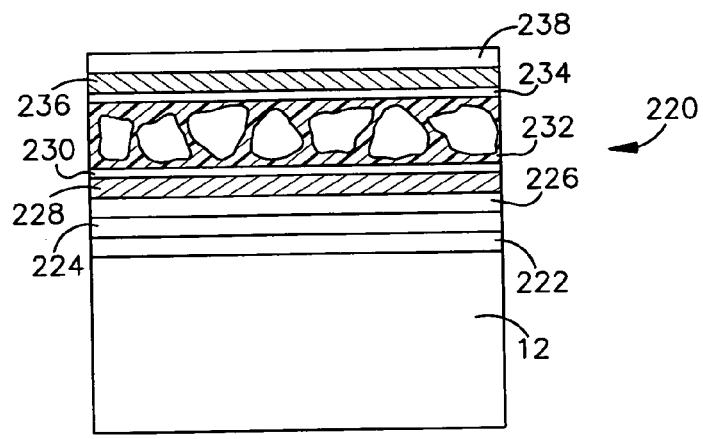
Figure 25A:
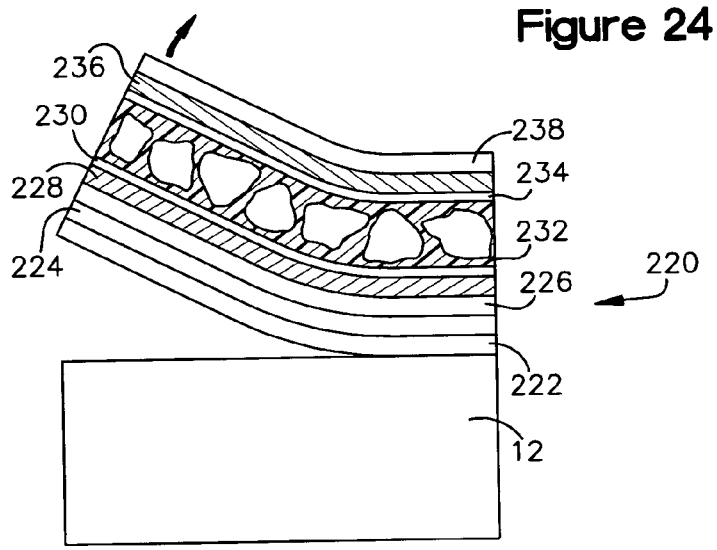
Figure 25B:
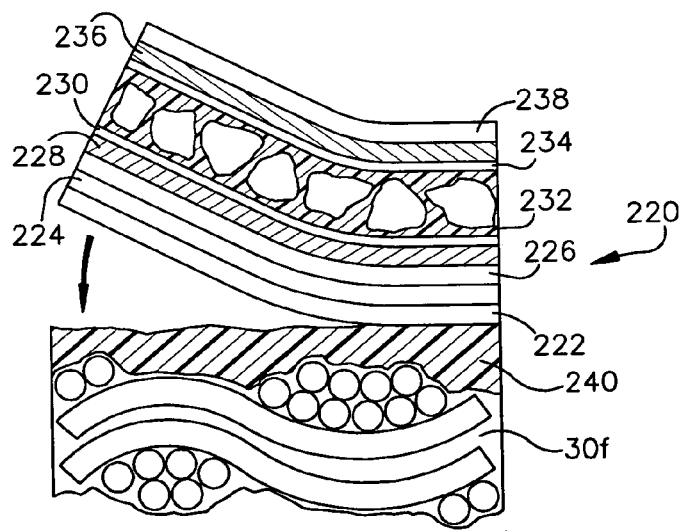

FIGS. 24 and 25a are side cross-sectional views of the fabrication of another aspect of a display film constructed in accordance with the invention and FIG. 25b is a side cross-sectional view of the display film of FIG. 25a transferred onto a substrate; and FIG. 26 is a perspective exploded view illustrating the fabrication of the conductive electrode layers of the inventive display and mounting to a substrate.

VIII. DETAILED DESCRIPTION

Figure 1:
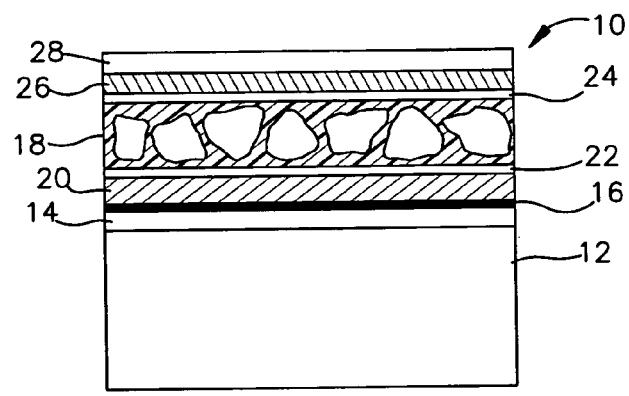
FIGS. 1 and 2a are side cross-sectional views of the fabrication of one aspect of a display film constructed in accordance with the invention and FIG. 2b is a side cross-sectional view of the display film of FIG. 2a transferred onto a substrate.

One embodiment of the invention is a monochrome bistable cholesteric reflective lift off or transfer display film that can be transferred to fabric, polymer, or other substrate that is transparent or opaque. FIG. 1 shows a display film 10 containing various layers that make up the film. The film is fabricated by coating or casting each of the layers on a surface that can serve as a release liner 12 in the following sequence. An optional casting layer 14 is first coated or laminated onto the release liner 12. The casting layer serves several purposes. The casting layer is a film that, once dried or cured can be removed from the release liner. The casting layer also provides a suitable surface for wetting the next coating in the sequence which can be an optional opaque light absorbing layer 16 to serve as a dark background. Alternatively, if a dark background is not used, the next layer may be one of the display electrode layers. The casting layer is sufficiently rugged to be lifted off the release liner and subsequently laminated onto a substrate.

Figures 2A, 2B:
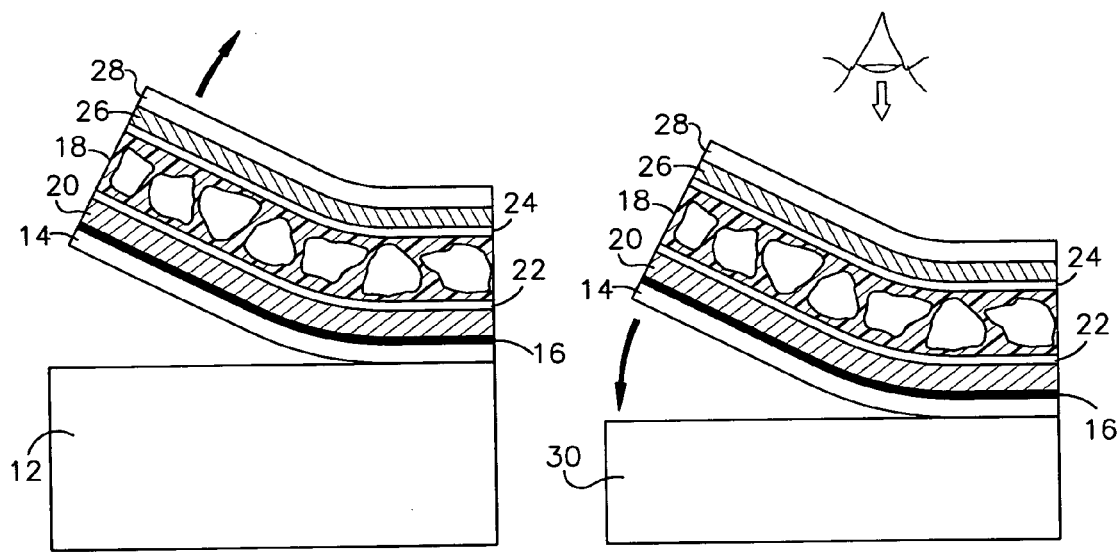

The light absorbing layer 16, usually black in color, is coated onto the casting layer. The light absorbing layer adheres to the casting layer and, in this embodiment, serves to absorb unwanted light passing through cholesteric liquid crystal layer 18. The resulting display is observed from above in the direction of the arrow (FIG. 2b). The material of the light absorbing layer serves to wet the next coating in the sequence, the lower conductive electrode layer 20.

The lower conductive electrode layer 20 is coated or printed and suitably patterned on the light absorbing layer. In this embodiment, the conducting material does not have to be transparent but is desired not to be reflective. Carbon based materials and conducting polymers are suitable as long at they provide sufficient conductivity, for example, less than 1000 Ohms/square resistivity, a parameter also controlled by the thickness of the layer. Carbon based materials and conducting polymers might be suitable in that, often they can be printed to form a desired electrode pattern.

An optional electrical insulation layer 22 over the conducting electrodes is advantageous in preventing electrical shorting. However, if the cholesteric liquid crystal is dispersed in a binder or polymer matrix that is itself sufficiently electrically insulating, the insulation layer may be omitted. The insulation layer is preferably less than 1.0 micron thick in order to maintain suitable drive voltages.

The cholesteric liquid crystal layer 18, which is in the form of a dispersion composed of liquid crystal dispersed in a polymer matrix, is then coated over the insulation layer. The liquid crystal dispersion can be made from any of several different processes such as emulsification or microencapsulation processes. A preferred dispersion is prepared from a latex emulsion since these binders possess desired wetting and adhesion properties for coating. For the cholesteric liquid crystal, the droplet size should be large enough, for example, greater than 1.0 micron, to allow bistability. The term, droplet, used herein can have any of a variety of shapes including spherical, elliptical, and amorphous shapes. The thickness of this liquid crystal coating determines the drive voltage of the display as well as the display brightness. To optimize brightness, it is desired that this layer be at least 4.0 microns in thickness; however, to maintain moderate to low drive voltages, the layer should be less that 15 microns thick depending on the physical properties of the liquid crystal material.

A second optional electrical insulation layer 24 is advantageous in preventing electrical shorts. This layer may also serve as an isolation or wetting layer for the transparent conducting layer 26.

The transparent conducting layer 26 is printed or coated and suitably patterned to serve as the upper electrode. Transparent conducting polymers or carbon nanotube materials are suitable for this purpose. The transparency-to-conductivity ratio depends on the thickness of the coating. If response speed of the display is not an issue, a resistivity as high as a few thousand Ohms/square is suitable.

An optional clear protective layer 28 is applied to the transparent conductive layer 26. The clear protective layer or "clear coat" 28 is advantageous in ruggedizing the display and protecting it from the environment. The term "clear coat" finds analogy to clear coats used as outer protective coatings on the paint finish of automobiles.

The display film is cured. Then, as shown in FIG. 2a the cured display film is lifted from the release liner 12. As shown in FIG. 2b, the display film is then transferred or laminated onto a substrate 30.

Figure 3:
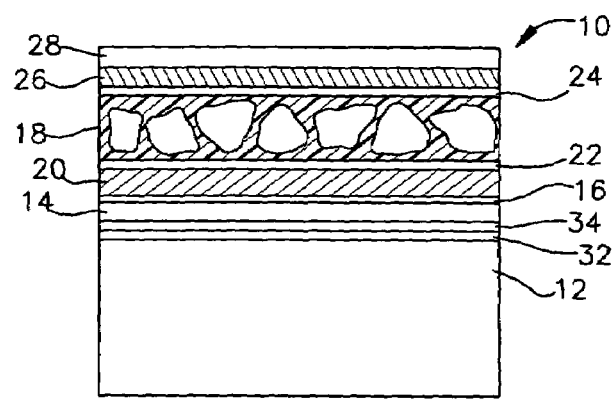

Another aspect of the invention is similar to the foregoing display film but employs an adhesive layer 32 and/or preparation layer 34. This display film is shown in FIG. 3 where like reference numerals describe similar components throughout the several views. Display components hereafter that are the same or similar to those previously described, will not be described in detail again, it being understood that the previous detailed description of materials, characteristics and features of the display components applies equally to subsequent display components. The only difference between the display film shown in FIG. 3 and the display film shown in FIG. 1, is the addition of an adhesion layer and an optional preparation layer sometimes needed to present a smooth surface between the adhesion layer and the next layer in the display which may be a casting layer, if needed, or the conductive electrode. The preparation layer may also serve as an isolation layer to isolate the other display elements from solvents in the adhesion layer.

Figures 4A, 4B:
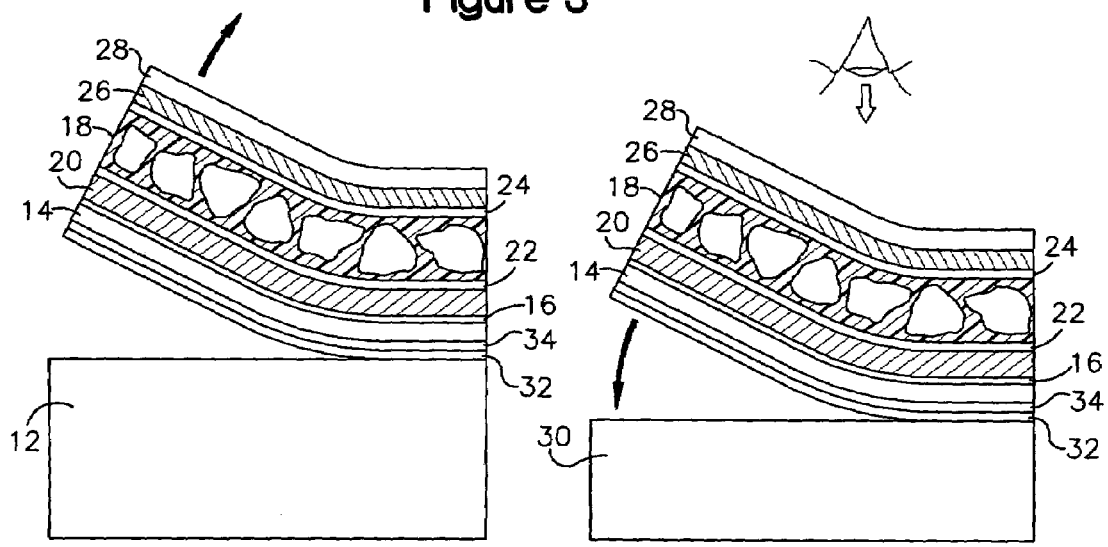

As shown in FIG. 4a, once the display film has cured it is lifted from the release liner. The adhesive layer 32, albeit having the ability to possess relatively strong adhesive properties, nonetheless does not bind to the release liner 12 with high adhesion. The release liner may have a waxy or other surface that the adhesive of the adhesion layer does not bind strongly or the adhesive and release liner materials may have compositions that prevent wetting of the adhesive material to the release liner. As shown in FIG. 4b, the display film is then transferred or laminated onto a substrate 30. The adhesive layer 32 binds the display film to the substrate 30 with a desired level of adhesion.

In a specific design, the adhesive layer 32 is composed of pressure sensitive adhesive and has a thickness, for example, of about 25 microns. The layer 34 is a preparation or casting layer. One suitable composition of the casting layer 34 is PET having a thickness, for example, of about 12 microns. A particularly preferred thickness of the casting layer is less than 20 microns and, in particular, in a range of 5–15 microns.

Figure 4C:
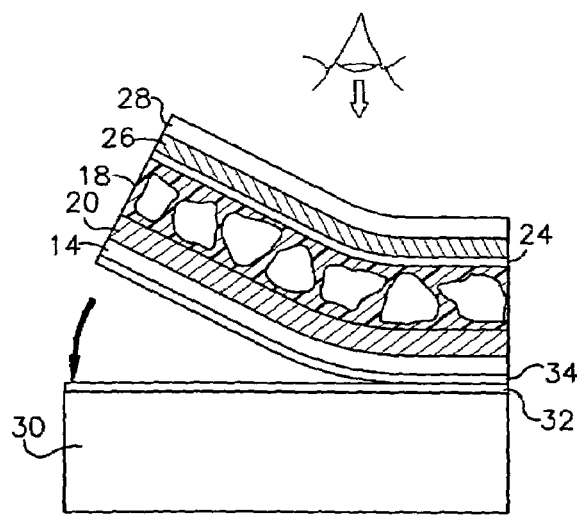
FIG. 4c is a side cross-sectional view of a variation of the display shown in FIG. 4b.

Referring to FIG. 4c, as an illustration of one of the many variations that are possible in the present invention, the stacked display film does not require insulating layers because the polymer matrix in the liquid crystal layer is sufficiently electrically insulating to prevent shorts between the electrode layers. The display film also lacks a light absorbing layer because the layers below the liquid crystal layer including the substrate are not reflective or are sufficiently light absorbing. The display film includes the optional preparation layer 34, not the adhesive layer 32. The adhesive layer is laminated onto the substrate and could have adhesive properties on one or both sides.

The cured stacked display film is lifted from the release liner (not shown). The stacked display film is then transferred onto the substrate 30. In particular, the optional preparation layer (or casting layer if no preparation layer is used) bonds to the adhesive layer.

Figure 5:
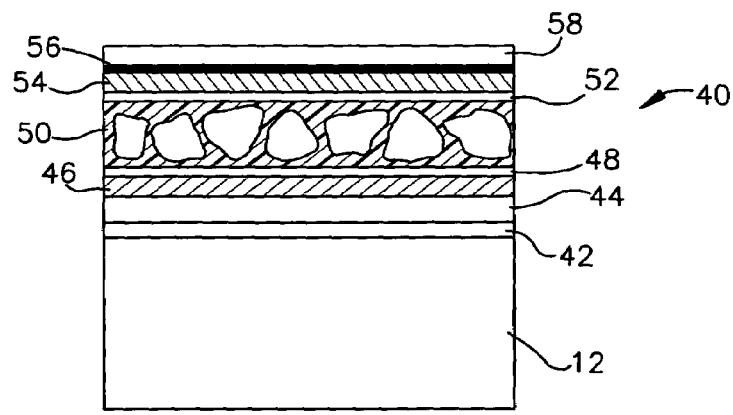
FIGS. 5 and 6a are side cross-sectional views of the fabrication of another aspect of a display film constructed in accordance with the invention and FIG. 6b is a side cross-sectional view of the display film of FIG. 6a transferred onto a substrate.

Referring to FIG. 5, another embodiment of the invention is directed to a monochrome reflective transfer display film that is transferred onto a clear substrate such as a transparent polymer or glass. In this case, the transfer film does not include a dyed or light absorbing layer. The "lower" conductor (at the time of transferring the display film to the substrate) is either a transparent conductor or may not be part of the transfer film if the lower conductor is on the substrate. The upper conductor in the sequence in which the stacked layers are transferred to the substrate may be an opaque conductor in which case the clear coat is replaced by a black coat. Thus, during fabrication of the transfer display film, either the lower or the upper part of the film in relation to the release liner can be ultimately near the top or bottom of the operational display after transfer to the substrate. In addition, the top and bottom of the stacked display film can be either clear or opaque. It will be appreciated that terms such as upper, lower, outer and the like are used to assist in describing features of the invention. These terms are relative and change with the orientation of the display, the display film and the layers of the display film and thus, these terms should not be used to limit the present invention.

In particular, the display film 40 is fabricated by laminating or casting each of the layers on a surface that can serve as the release liner 12 in the following sequence. An optional adhesion layer 42 is first coated or laminated onto the release liner 12. An optional casting layer 44 is laminated onto the adhesion layer. A conductive electrode layer 46 (that will be the upper electrode layer in the finished display) is then coated or printed and suitably patterned on the underlying layer. In this embodiment, the conducting material is transparent. Carbon based materials and conducting polymers are suitable as long at they provide sufficient conductivity; for example, less than 1000 Ohms/square resistivity, a parameter also controlled by the thickness of the layer. Conducting polymers and carbon based materials might be suitable in that, often they can be printed to form a desired electrode pattern.

An optional electrical insulation layer 48 printed or coated over the electrode layer 46 is advantageous in preventing electrical shorting. However, if the cholesteric liquid crystal is dispersed in a binder or polymer matrix that is itself sufficiently electrically insulating, the insulation layer may be omitted. The insulation layer is preferably less than 1.0 micron thick in order to maintain suitable drive voltages.

The cholesteric liquid crystal layer 50, which is in the form of a dispersion composed of liquid crystal dispersed in a polymer matrix, is then coated over the insulation layer. The liquid crystal dispersion material can be made from any of several different processes such as emulsion or microencapsulation processes.

A second optional electrical insulation layer 52 may be advantageous in preventing electrical shorts.

A transparent or nonreflective conductive layer is then printed or coated and suitably patterned to serve as the conductive electrode layer 54 (that will be the lower electrode layer of the finished display). Transparent conducting polymers or carbon nanotube materials are suitable for this purpose. The transparency-to-conductivity ratio depends on the thickness of the coating. If response speed of the display is not an issue, a resistivity as high as a few thousand Ohms/square is suitable.

An optional light absorbing layer 56 is printed or coated onto the electrode layer and will be located near the bottom of the finished display.

Finally, an optional protective coating 58 is printed or coated onto the light absorbing layer to ruggedize the display. This layer forms the bottom of the finished display, which can be mounted to a housing of the display device.

Figure 6A:
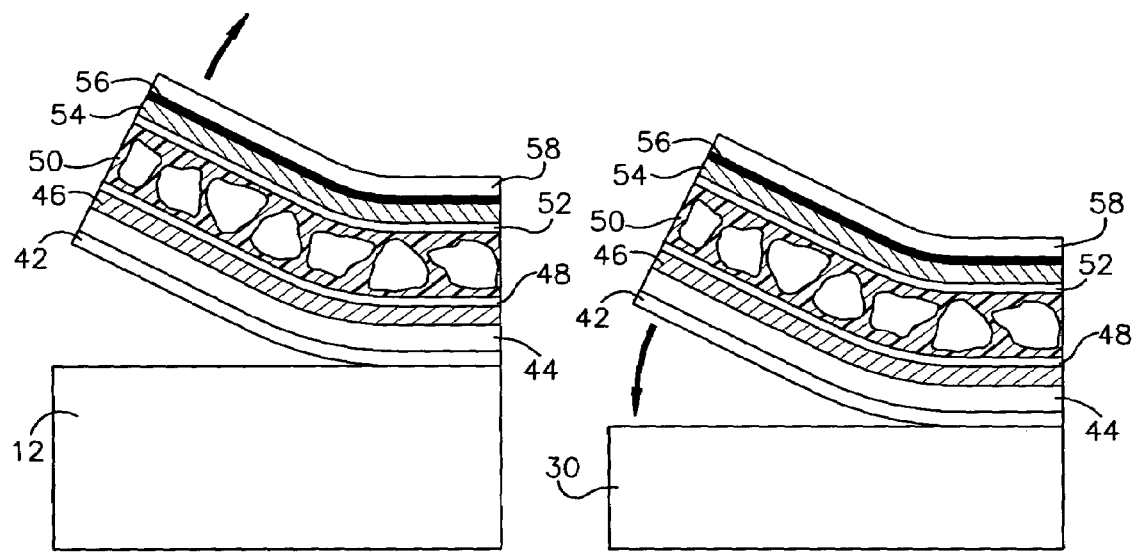
Figure 6B:
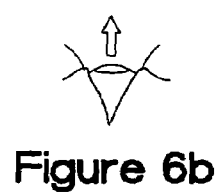

The display film is cured. Then, as shown in FIG. 6a the cured display film is lifted from the release liner 12. As shown in FIG. 6b, the display film is then transferred or laminated onto the back side of a transparent substrate 30. The adhesive layer adheres the display film to the substrate with a desired level of adhesiveness.

An embodiment of the invention laminates the transfer film "upside down," i.e., with the side of the uppermost protective layer on the stacked display film relative to the release liner, being transferred so as to be adjacent to the substrate. In this embodiment the uppermost protective layer of the stacked display film is replaced with a preparation coat that may itself function as an adhesive or as a layer that is effective to bind to an adhesive layer.

If the intended substrate is a bottom substrate that is not transparent, it may be desirable that the preparation layer is dyed to absorb light over some spectral band width and that the light absorbing layer (commonly added as one of the first layers during fabrication of the stacked display film) is removed. Furthermore, the lower conducting electrode as well as the layers adjacent the release liner would be transparent. If the substrate is intended to form an upper transparent substrate of the display device, the light absorbing layer would be coated as one of the first layers in the fabrication process as described in more detail below.

Figure 7:
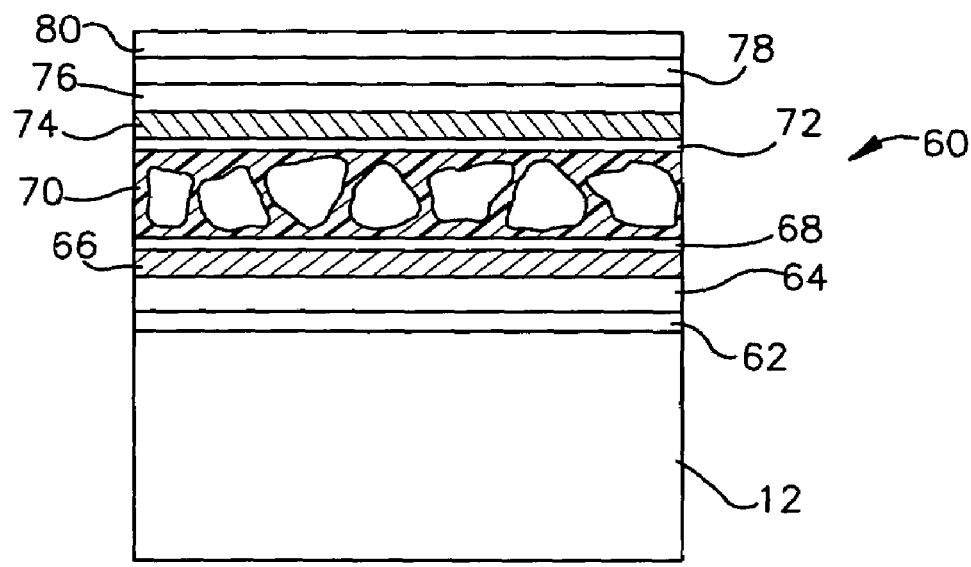

More specifically, referring to FIG. 7, the display film 60 includes an optional casting layer 62 printed or coated on the release liner 12. In this embodiment, the display film is flipped 180° in the process of transfer onto the substrate as described below. The casting layer may be transparent or need only be nonreflective depending on whether the substrate is an upper or lower substrate of the display device. Next, an optional light absorbing layer 64 is printed or coated. This light absorbing layer 64 would not be used when the display film is transferred onto a substrate 30b, 30c that is intended to form the bottom portion of the display device (FIGS. 9b, 9c). However, when the substrate 30d is intended to form a top portion of the display device (FIG. 9a), the light absorbing layer 64 would be used in the position shown.

Next, the conductive electrode layer 66 is printed, coated and suitably patterned onto the underlying layer. Upon transfer onto a transparent upper substrate 30d (FIG. 9a), the electrode layer 66 will be located as a lower electrode of the display device. In this case, the electrode layer need not be transparent but should be non-reflective. Upon transfer of the stacked display film to a bottom substrate 30b, 30c (FIGS. 9b, 9c), the electrode layer 66 is an upper electrode and should be transparent. An optional insulating layer 68 is printed or coated onto the underlying layer. Next, the cholesteric liquid crystal dispersion layer 70 is coated or printed onto an underlying layer of the stacked layers. An optional insulation layer 72 is printed or coated onto the liquid crystal layer.

Next, an electrically conductive electrode layer 74 is printed or coated and suitably patterned onto the underlying layer. If the intended substrate is a transparent upper substrate 30d (FIG. 9a), the electrode layer 74 is an upper electrode layer and should be transparent. If the intended substrate is a lower substrate 30b, 30c (FIGS. 9b, 9c), the electrode layer 74 is a lower electrode layer and need not be transparent but should be nonreflective.

Next, an optional light absorbing layer 76 is printed or coated onto the electrode layer 74. If the intended substrate is a clear upper substrate 30d (FIG. 9a), no light absorbing layer 76 would be printed or coated onto the electrode layer at this location. If the intended substrate is a clear or insufficiently light absorbing, bottom substrate 30c (FIG. 9c) then the light absorbing layer 76 is used. If the intended substrate 30b is opaque and sufficiently light absorbing, the light absorbing layer 76 may be omitted. However, if improved contrast is desired, the light absorbing layer may be used even with opaque bottom substrate 30b (FIG. 9b). It should also be apparent to those skilled in the art that light absorbing layers may not only absorb all or some light of certain wavelengths but may also be designed to reflect different colors in this and any other embodiment of the present invention.

The next layer is an optional preparation or protective layer 78. This is followed by an optional adhesive layer 80. As shown in FIGS. 9a–c, the adhesive layer may directly bond to the substrate. The optional preparation layer may interact with or hold the adhesive layer to the rest of the stacked display film or provide other functions such as refractive index matching or to protect or ruggedize the display film and possibly act as an isolation layer to protect the dispersion from molecules in the adhesive.

In another aspect of the invention, an adhesive layer 81 could be applied to the substrate (FIG. 9d), in which case the adhesive layer 80 would not be needed on the stacked display film. The preparation or protective layer 78 of the display film would then be bonded to the substrate via the substrate adhesive layer 81. In the case where no preparation or protective layer 78 is used, the next layer of the stacked display film would be bound to the substrate adhesive layer 81.

In the case of transfer of the stacked display film to a transparent upper substrate (FIG. 9a), the preparation/protective and adhesive layers should be transparent. If the stacked display film is transferred to a lower substrate, the preparation/protective and adhesive layers need not be transparent but should not be reflective (FIGS. 9b and 9c).

Another embodiment of the invention is directed to a monochrome cholesteric reflective display that possesses full reflective brightness, reflecting more than 50% of incident light. In this embodiment, the liquid crystal dispersion layer is made up of two stacked coatings, one of a left hand twist cholesteric liquid crystal and the other of right hand twist cholesteric liquid crystal, both tuned to the same pre-selected peak wavelength of reflection and bandwidth. Stacked layers of cholesterics of opposite handedness reflect both components of circular polarized light and as such can, theoretically, reflect all incident light at the Bragg wavelength of the films. Practically, some light is lost to scattering for defects in the dispersion and unwanted reflections and absorptions from the other layers in the stack. The total reflection can approach 80% of incident light as indicated in U.S. Pat. No. 6,320,563. Instead of two stacked layers, left and right handed microencapsulated droplets may be cast as one coating.

Figure 10:
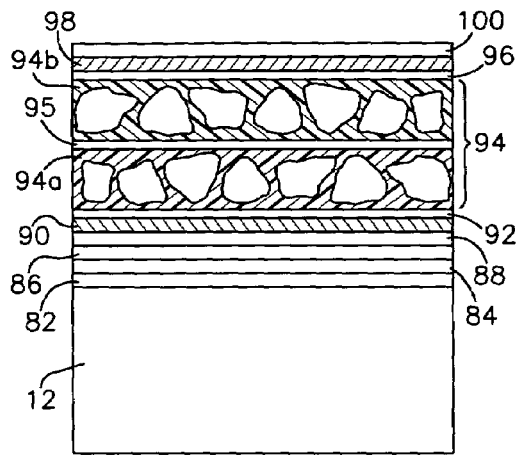

More specifically, the display film includes an optional adhesive layer 82 printed or coated on the release liner 12 and an optional preparation layer 84 printed or coated on the adhesive layer as illustrated in FIG. 10. An optional casting layer 86 is printed or coated on the underlying layer. An optional light absorbing layer 88 is printed or coated on the casting layer. The light absorbing layer is used if the display film is mounted onto a substrate that is not sufficiently light absorbing in this display that is viewed from the side that is distal to the substrate. Next, an electrode layer 90 is printed or coated and suitably patterned onto the underlying layer. This is followed by an optional electrically insulating layer 92.

The cholesteric liquid crystal dispersion layer 94 is printed or coated next. This is composed or two sublayers: sublayer 94a having a right or left hand twist sense and sublayer 94b having the opposite twist sense. An optional barrier layer 95 is coated in between to isolate the two sublayers. This provides the display with optimized brightness because both left and right hand circularly polarized light is reflected from the cholesteric layer 94. The pitch length of each liquid crystal layer can be tuned to reflect light at the same wavelength of peak reflection, creating a monochrome display.

Next, an optional electrically insulating layer 96 is printed or coated on the liquid crystal layer. An electrode layer 98 is printed or coated and suitably patterned onto the underlying layer. Next, an optional protective layer 100 is printed or coated onto the electrode layer.

Figure 11A:
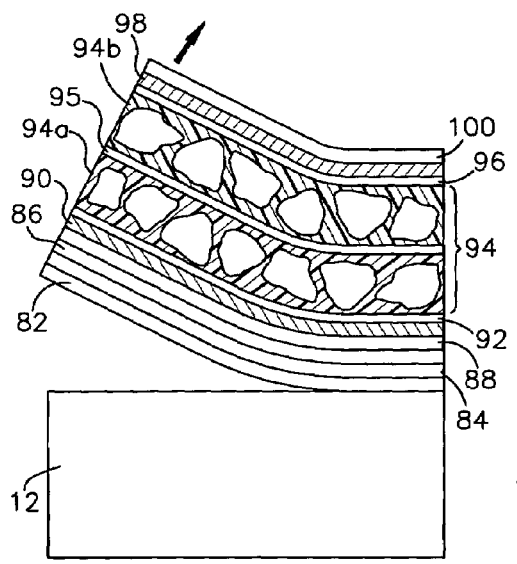
Figure 11B:
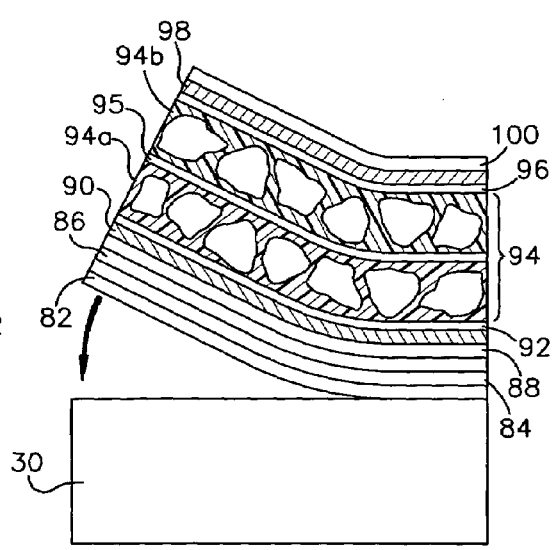

As shown in FIG. 11a, the cured display film is lifted from the release liner 12. The display film is transferred onto the substrate 30 as shown in FIG. 11b. The adhesive layer 82 bonds to the substrate, retaining the display film on the substrate.

Figure 10A:
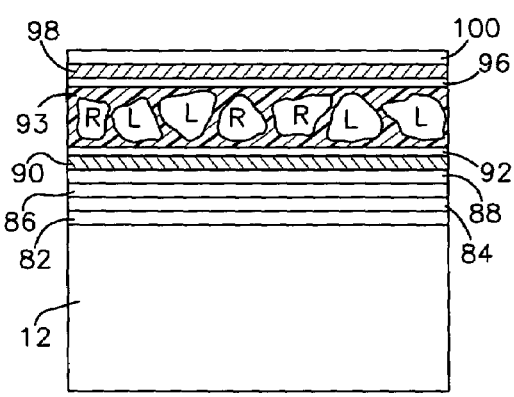
FIG. 10a is a side cross-sectional view of a variation of the display of FIG. 10.

The display shown in FIG. 10a is the same as in FIG. 10 except that rather than using two LC sublayers of right and left handed twist sense and an optional barrier layer between them, the display uses a single LC layer 93 in which LC droplets of right and left handed twist sense are dispersed.

Figure 12:
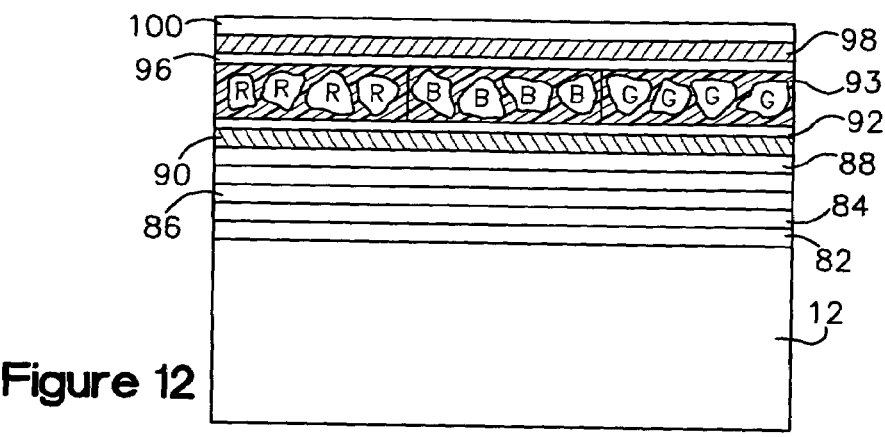
FIGS. 12 and 13a are side cross-sectional views of the fabrication of another aspect of a display film constructed in accordance with the invention and FIG. 13b is a side cross-sectional view of the display film of FIG. 13a transferred onto a substrate.
Figure 13A:
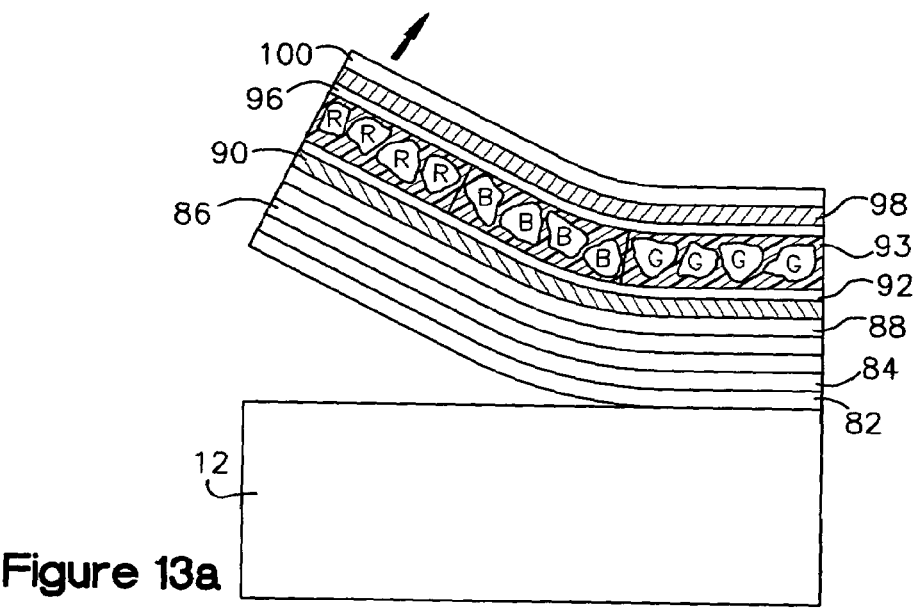
Figure 13B:
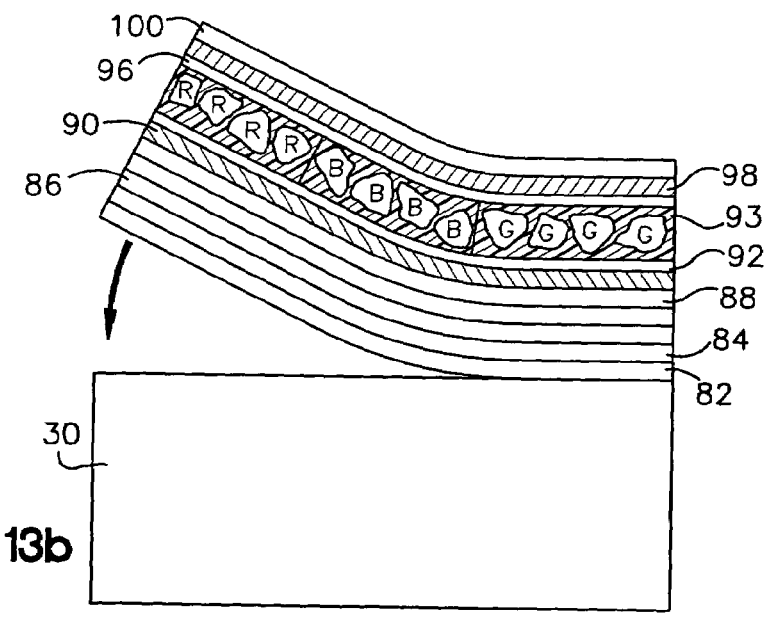

A full-color, single reflective dispersion layer is possible if the droplet dispersion layer is patterned with red (R), green (G) and blue (B) pixels within a single layer for additive color mixing (FIGS. 12, 13a, 13b). The film is similar to the display film of FIG. 10, except that the droplet dispersion has been patterned by a process such as UV irradiation of cholesteric material with a UV sensitive twisting power as disclosed in U.S. Pat. No. 5,668,614, which is incorporated herein by reference in its entirety.

Another embodiment of the invention is a full color display film 110 fabricated using a three layer RGB (red, green, blue) stack with a single conducting electrode layer in between each layer (FIG. 14, 15a, 15b). Such a display is addressed by a shared electrode addressing scheme possible with bistable cholesteric dispersions, as disclosed in the '141 application.

In particular, an optional adhesive layer 112 is printed or coated onto the release liner 12. This is followed by printing or coating of an optional preparation layer 114. An optional casting layer 116 is then printed or coated onto the underlying layer. Next, an optional light absorbing layer 118 may be printed or coated. An electrode layer 120 is printed or coated and suitably patterned next onto the underlying layer. This is followed by an optional electrical insulation layer 122.

Next, a first cholesteric liquid crystal dispersion layer 124 is printed or coated, reflecting one of the primary colors, e.g., red. A first electrode layer 126, which is sandwiched between optional electrical insulation layers 128, 130, is printed or coated and suitably patterned next. This is followed by printing or coating a second cholesteric liquid crystal dispersion layer 132 reflecting a second primary color, e.g., green. A second electrode layer 134, which is sandwiched between optional electrical insulation layers 136, 138, is printed or coated and suitably patterned next. A third cholesteric liquid crystal dispersion layer 140 reflecting the third primary color, e.g., blue, is printed or coated next. This is followed by an optional electrical insulation layer 142. A third electrode layer 144 is printed or coated and suitably patterned next. An optional protective layer 146 is added to ruggedize the display. It will be appreciated by those skilled in the art that all of the layers upstream of the first liquid crystal layer in the direction of incident light, should be transparent and that the layers downstream of the first liquid crystal layer need not be transparent but should be non-reflective. Suitable modifications to the particular display shown can be made as would be apparent to one skilled in the art in view of this disclosure, such as to design the display film for transfer onto a clear upper substrate and to invert the display 110 after curing on the release liner during transfer to the substrate.

Added brightness may be achieved if each of the R, G and B layers contains a left twist and a stacked right twist sublayer (FIG. 16, 17a, 17b). This display is similar to that shown in FIGS. 14, 15a, 15b. The difference in this display is that each of the liquid crystal layers is comprised of sublayers each having a different twist sense than the other sublayer but reflecting light at the same peak reflection and bandwidth as the other sublayer. Liquid crystal layer 125 is composed of sublayers 125a, 125b; liquid crystal layer 133 is composed of sublayers 133a, 133b; liquid crystal layer 141 is composed of sublayers 141a, 141b. Optional barrier layers 127, 135 and 143 are disposed between sublayers. This provides the display with optimized brightness.

Figure 16A:
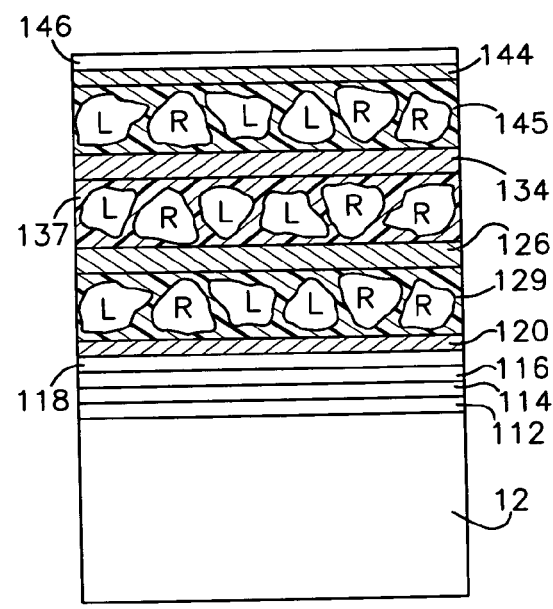
FIG. 16a is a side cross-sectional view of a variation of the display of FIG. 16.

The display shown in FIG. 16a is the same as in FIG. 16 except that rather than two LC sublayers of right and left handed twist sense and an optional barrier layer between them, the display uses a single LC layer 129, 137, 145 in which the LC droplets of right and left handed twist sense are dispersed and no such barrier layer.

Figure 18:
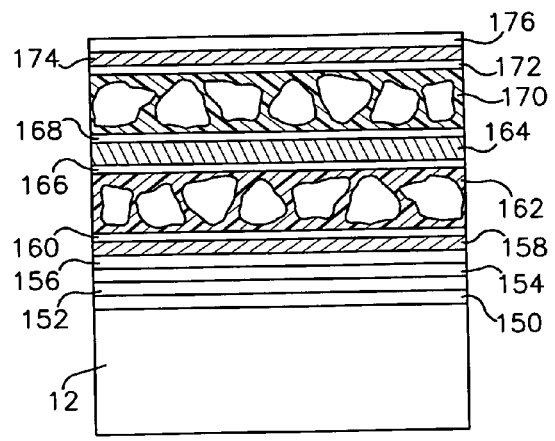
FIGS. 18 and 19a are side cross-sectional views of the fabrication of another aspect of a display film constructed in accordance with the invention and FIG. 19b is a side cross-sectional view of the display film of FIG. 19a transferred onto a substrate.
Figure 19A:
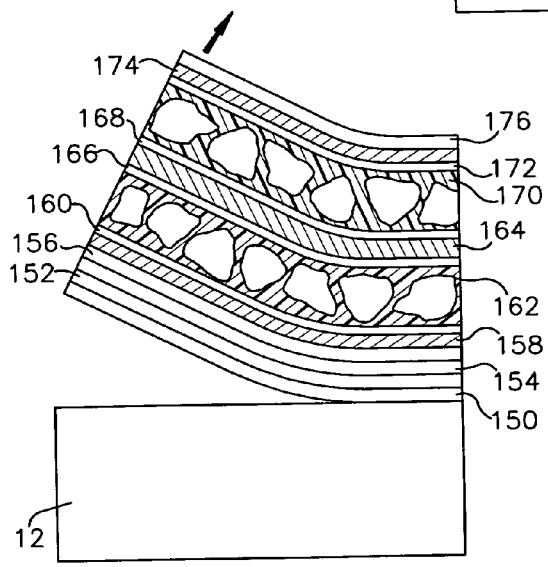
Figure 19B:
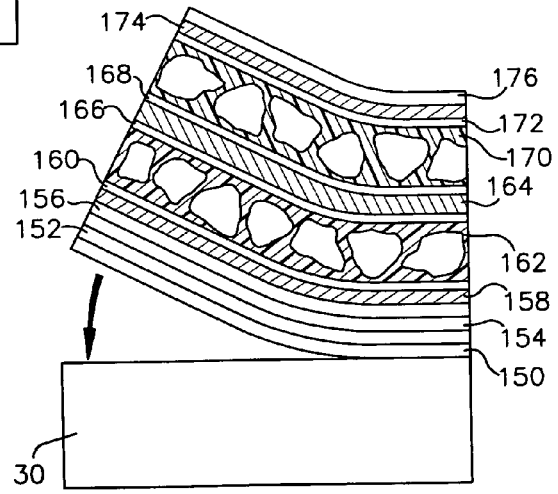

Yet another embodiment of the invention features an infrared reflective display containing at least one droplet dispersion layer of the stack that reflects in the infrared such as might be used for night vision purposes (FIG. 18, 19a, 19b) as disclosed in U.S. Pat. No. 6,034,752. More specifically, an optional adhesive layer 150 followed by an optional preparation layer 152 are printed or coated onto the release liner. Next, an optional casting layer 154 is printed or coated onto the underlying layer. An optional light absorbing layer 156 is printed or coated onto the casting layer. An electrode layer 158 is printed or coated and suitably patterned next. Onto this is printed or coated an optional electrical insulation layer 160. Next is printed or coated a cholesteric liquid crystal dispersion layer 162 having a pitch length effective to reflect infrared electromagnetic radiation. An intermediate electrode layer 164, which is sandwiched between optional electrical insulation layers 166, 168, is printed or coated and suitably patterned onto the underlying layer. Another cholesteric liquid crystal dispersion layer 170 is disposed next, having a pitch length effective to reflect visible light. An optional electrical insulating layer 172 is printed or coated next. An electrode layer 174 is printed or coated and suitably patterned next. Finally, an optional protective coating 176 forms an outer surface of the display film.

A self-powered display may be achieved by laminating the transfer display film onto a solar panel as the substrate 30 (or on a substrate on which a solar panel is mounted), whereby light that is not reflected by the cholesteric material can be absorbed in the solar panel for conversion into electrical power for powering the display. One such transfer film could be that of FIG. 1 (display film 10) where the light absorbing layer 16 is eliminated, so that light can be absorbed in the solar panel and used to power the display.

Figure 20:
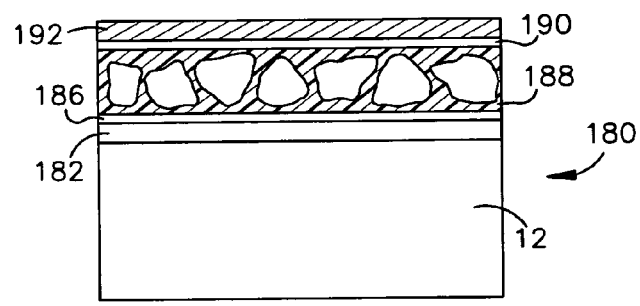
FIGS. 20 and 21a are side cross-sectional views of the fabrication of another aspect of a display film constructed in accordance with the invention and FIG. 21b is a side cross-sectional view of the display film of FIG. 21a transferred onto a substrate.
Figure 21A:
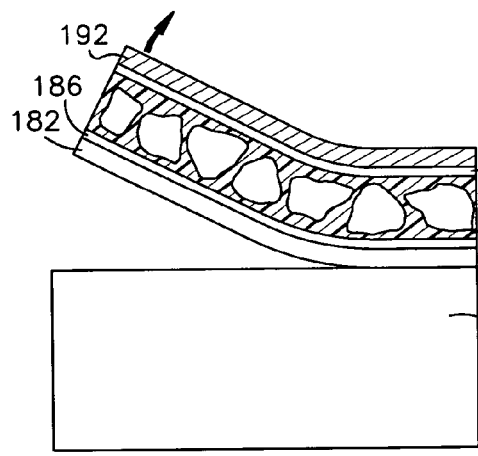
Figure 21B:
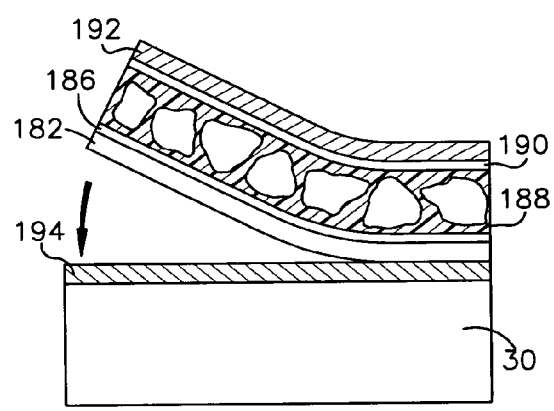

Another display film is mounted onto an active matrix backplane as shown in FIGS. 20, 21a, 21b. The optional casting layer 182 is printed or coated onto the release liner 12. An optional electrically insulating layer 186, which may also serve as a casting layer, is printed or coated onto the release liner 12. The next layer is a cholesteric liquid crystal dispersion layer 188. The dispersion layer may also serve as the casting layer. An optional electrical insulation layer 190 is printed or coated next. Finally, an unpatterned protective/electrically conductive layer 192 is printed or coated onto the underlying layer.

The cured display film is lifted from the release liner (FIG. 21a). The display film is then transferred onto a substrate 30 containing an active matrix backplane 194 (FIG. 21b), which can electrically address individual pixels of the display.

Figure 22:
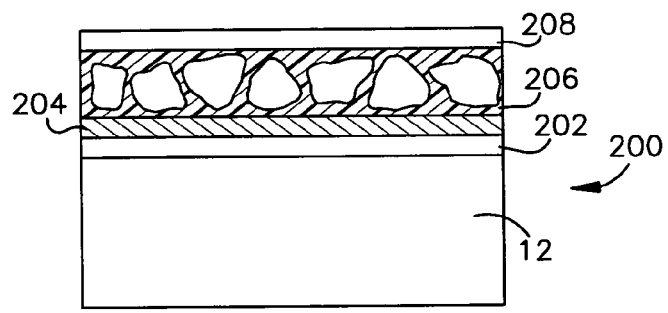
FIGS. 22 and 23a are side cross-sectional views of the fabrication of another aspect of a display film constructed in accordance with the invention and FIG. 23b is a side cross-sectional view of the display film of FIG. 23a transferred onto a substrate.
Figure 23A:
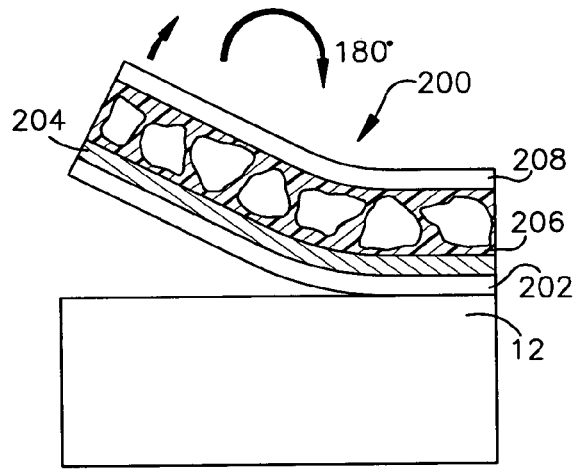
Figure 23B:
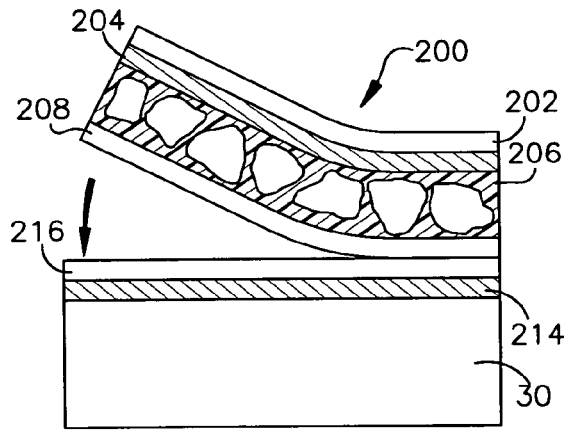

FIGS. 22, 23a, 23b show an embodiment of the invention in which some of the display components are located on the substrate. The display film 200 includes an optically transparent casting layer 202 printed or coated onto the release liner. An optically transparent conducting layer 204 is printed or coated and suitably patterned onto the casting layer. Next, a cholesteric liquid crystal dispersion layer 206 is printed or coated. Then, an optional adhesion layer 208, which may also serve as an electrical insulating layer, is printed or coated onto the liquid crystal layer. As illustrated in FIG. 23a, the film is lifted off of the release liner and flipped 180 degrees during transfer. As illustrated in FIG. 23b, the film is laminated onto the substrate containing a printed or coated and suitably patterned conductor layer 214 such that the side of the transfer film containing the adhesion layer 208 (shown at an upper portion of the stack in FIG. 22) is adjacent to the conductor 214 on the substrate (shown at a lower portion of the stack in FIG. 23b). If the optional adhesion layer 216 is applied to the substrate, the adhesion layer 208 of the stacked display film may not be needed and vice versa. The electrode layer 204 of the multi-layer stack and the electrode layer 214 on the substrate sandwich the liquid crystal dispersion layer 206 therebetween and together form a completed display. The layer 202 serves not only as a casting layer during printing or coating the layers on the release liner, but also as a transparent outer protective layer once the display film has been laminated onto the substrate.

Another embodiment of the present invention is directed to the use of flexible substrates. FIG. 24 shows a display film 220 adapted for use on a fabric substrate. An optional adhesive layer 222 is printed or coated onto the release liner 12. An optional preparation layer 224 is printed or coated onto the underlying layer. An optional casting layer 226 is printed or coated onto the underlying layer or, if none, onto the release liner 12. An optional electrode layer 228 is printed or coated and suitably patterned next. In the case of application of the display film to a substrate that is sufficiently light absorbing, no light absorbing layer may be used. However, it should be apparent that a light absorbing layer could be added below the liquid crystal layer if the substrate is not sufficiently absorptive of light. An optional electrical insulation layer 230 is printed or coated next. Next, the cholesteric liquid crystal dispersion layer 232 is printed or coated on the underlying layer. Next, an optional electrical insulation layer 234 is printed or coated onto the liquid crystal layer. Then, an electrode layer 236 is printed or coated and suitably patterned onto the underlying layer. This is followed by printing or coating an optional protective layer 238 to ruggedize the display.

One suitable flexible substrate is in the form of a fabric 30f. On the fabric, an optional planarization layer 240 may be disposed. This layer could include patterned electrodes in which case the electrode layer 228 would be omitted. Although it is not necessary for the fabric to be smooth for lamination of the display film onto the fabric substrate, if used, the planarization layer smooths the surface of a rough fabric substrate, in preparation of attachment of the transfer display film 220. The cured display film is lifted from the release liner (FIG. 25a). The display film is then transferred directly onto the fabric substrate 30f (FIG. 25b), or optionally onto the substrate made flat by the planarization layer. It will be appreciated that instead of the adhesive layer disposed on the display film, the adhesive layer could be disposed on the planarization layer (not shown).

Another embodiment features an optically addressable transfer display film to provide a display that can be optically addressed as disclosed in the publication "Reflective Display with Photoconductive Layer and Bistable Reflective Cholesteric Mixture" *Journal of the SID*, Vol. 5/3, pages 269–274 (1997) by Yoshida et al. This film eliminates the lower electrode and is transferred to a photoconductive sheet having an electrode underneath. While a continuous voltage is applied to the electrodes, light impinging on the display film will locally alter the resistivity of the photoconductor and drive the display film. The display can be addressed with an image suitably focused or projected on the film, or written with a scanned laser beam.

Transfer display films formed from other veneered stacks are possible depending on the desired application and fall within the scope of the present invention. For example, when sequences of display elements are listed, it will be apparent that the invention contemplates other elements interposed between the listed elements. In addition, whether the display film is placed on a light absorbing substrate or not affects the selection of the light absorbing layer in the multilayer stack. For example, laminating the display onto a transparent upper substrate, affects selection of whether and where a light absorbing layer will be used and affects selection of transparent or opaque conductors. In addition, variation in the invention is enabled by the use of an adhesive layer, preparation or protective layers. One or more of these layers may be disposed on the substrate, for example, a preparation layer on the multilayer film and the adhesive layer disposed on the substrate. The multilayer stack may include one, two or more electrode layers. If the substrate already has an electrode layer disposed on it, one less electrode layer may be formed in the multilayer stack. Transfer onto the substrate sandwiches the liquid crystal layer between the electrode layer in the display film and the electrode layer on the substrate. Also, in the case of other devices for applying a voltage to the liquid crystal layer, such as the active matrix backplane or device for optically addressing, the multilayer stack may omit an electrode layer. Finally, layers may have multi-functionality such as an electrode/planarization layer, a planarization/electrical insulation layer, an electrode/casting layer, an electrode/casting/protective layer, for example. Those skilled in the art in view of this disclosure will appreciate these and other variations to layer multi-functionality, layer and substrate type, to the sequence of the layers and to the orientation of the display film, which fall within the scope of the present invention. Accordingly, it will be apparent to those skilled in the art that the novel fabrication process of the present invention provides a myriad of variations in the design and use of the inventive display film, all without departing from the spirit and scope of the present invention.

FIG. 26 is a perspective drawing of a passive matrix display 300 illustrating, in an exploded view, how the conducting transparent electrodes 302 patterned as rows, may be electrically connected to conducting tabs 304 attached to the substrate 306. The column electrodes 308 are electrically connected to tabs 310, which are also attached to the substrate. The tabs are used for interconnecting drive electronics, not shown. Since the tabs for both of the columns 308 and rows 302 are disposed on the substrate, attaching the drive electronics is greatly simplified. It will be apparent that the intermediate layers of the display, including the cholesteric liquid crystal dispersion layer, are not shown in FIG. 26 for clarity.

Figure 8:
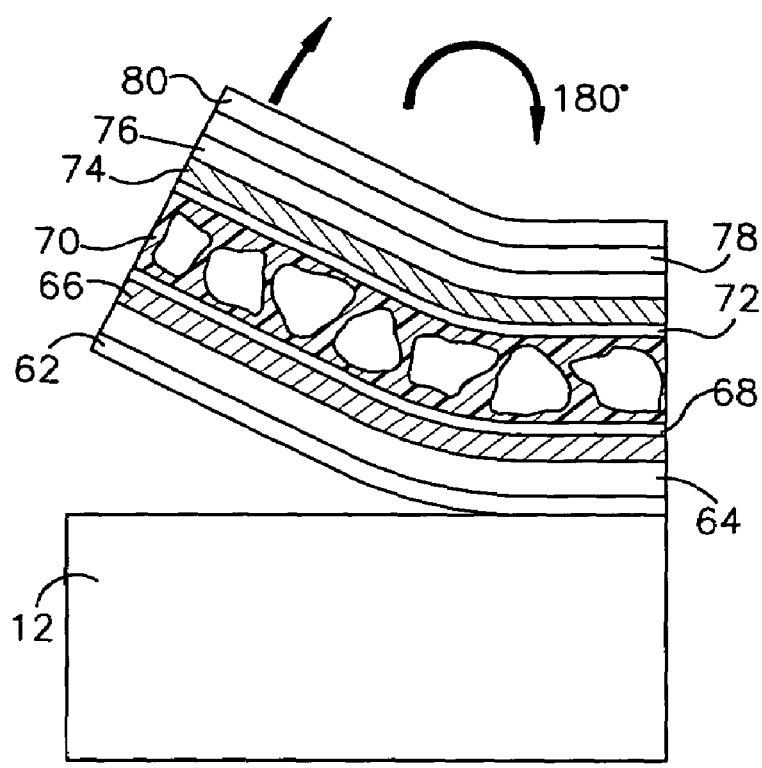

In the case where there are multiple electrode layers, such as that of a full-color display with an RGB stack of three cholesteric liquid crystal dispersion layers, the column and row electrodes can likewise be connected to tabs located on the substrate. For example, the two outer conducting layers in the full-color stacked substrate can be connected to tabs located on two sides of the substrate as illustrated in FIG. 8 of the '141 application, while the two intermediate electrode layers associated with the full color stack can be connected to tabs located on the two remaining sides of the substrate. Electrical connections of the electrodes to the tabs can be made with conducting polymer material. The ends of the electrodes of the conducting layers are left exposed in the coating process to allow for connection to the tabs.

Particular aspects of the invention will now be described by reference to the following examples that are provided to improve understanding of the invention and should not be construed to limit the scope of the present invention as set forth in the appended claims.

EXAMPLE 1

An operable 16×16 pixel passive matrix, lift-off cholesteric display film was made by first coating and printing the various display elements on a release liner to form a display film, then lifting the film off of the liner for subsequent lamination on a substrate. The release liner was a neoprene sheet with a fabric support available from Thor Labs (Newton, N.J.). A casting layer of aqueous polyurethane dispersion, WITCOBOND W232 (available from Crompton Corporation, CT) was deposited on the release liner using a Meyer rod technique and allowed to dry at room temperature. The dry thickness of the casting layer was approximately 10–12 microns. A layer of conductive polymer (ELP-3040 available from Agfa-Gevaert, Belgium) was screen printed on the casting layer as 5 mm wide, 15 cm long strips spaced 1 mm apart to serve as the column electrodes of the passive matrix display. After casting, the conducting polymer was cured at 100° C. for 10 minutes. A thin insulation layer (1–2 μm) of polyurethane dispersion (e.g. WITCOBOND W232) was cast on the conductive layer using a doctor blade technique. A layer of encapsulated cholesteric liquid crystal in polymer binder was coated from a water-based emulsion on the insulation layer using a doctor blade having a 25 micron gap and allowed to dry for 1 hour at room temperature. The thickness of the encapsulated liquid crystal layer was approximately 8–10 μm. The ratio between liquid crystal and binder was from 4:1 to 5:1. The emulsion was prepared from 0.4 g of ChLC KLC19 (EM Industries, Hawthorne, N.Y.) and 0.27 g of NeoRez R967 available from NeoResins, MA were emulsified with a homogenizer (PowerGen 700) at 1000 rpm for 3–4 minutes at room temperature. The emulsified ChLC formed droplets that were about 3–25 μm in diameter. After the emulsion layer dries at room temperature for 1 hour the droplet shape appeared to be flattened. Such droplet shape reduces light scattering and enhances the display brightness.

A second conductive electrode was a highly transparent conductive polymer Dipcoat available from Agfa. A thin layer of conductive polymer was deposited using air brushing over a mask and cured at room temperature. The mask was patterned to provide 5 mm wide, 15 cm long strips spaced 1 mm apart to form the row electrodes of the passive matrix display. For protection of the display, a 5–10 micron clear coat was deposited on the top of the second conductive electrode using a doctor blade. Moreover, the use of the clear coat layer made of the polyurethane dispersion (e.g. WIT-COBOND W232 or NeoRezR967) resulted in an increase in the transmission due to the refractive index matching.

The display film including all of the layers from the casting layer to the clear coat was lifted off from the release liner. The thickness of the lift-off display was around 30 microns. The lift-off display film was fully operational upon being electrically addressed by applying the appropriate voltages to the column and row electrodes. The bistable cholesteric material could be addressed to the planar (yellow reflective) by application of 135 volts or to the focal conic (non-reflective texture) with application of 105 volts. The appropriate voltages used to achieve the planar and focal conic states are dependent on the compositions and thicknesses of the layers of the display. Suitable such voltages may be selected by one of ordinary skill in the art in view of this disclosure based on the particular characteristics of the display layers. Pixels addressed to the planar and focal texture remained in their respective states even when the film was bent, twisted, folded, and even stretched. The display film had a contrast ratio of 12:1 and a brightness of 28%. The display film was very rugged and suitable for lamination on a substrate without damage. In this particular example, it is desired that the substrate be opaque and preferably black so that the focal conic state appears black and the reflective planar state appears a bright yellow and highly contrasting against the black.

EXAMPLE 2

An operable 16×16 pixel passive matrix, lift-off cholesteric display film was made by first coating and printing the various display elements on a release liner to form a display film, then lifting the film off of the liner for subsequent lamination on a substrate. The sequence of the layers was the same as in the Example 1 except that the insulation layer was made of polyurethane dispersion NeoRez R967.

EXAMPLE 3

An operable 16×16 pixel passive matrix, lift-off cholesteric display film was made by first coating and printing the various display elements on a release liner to form a display film, then lifting the film off of the liner for subsequent lamination on a substrate. The sequence of the layers was the same as in the Example 1 except that the casting layer was made of polyurethane dispersion NeoRez R967 and it did not have the insulation layer between the first conductive electrode and the layer of encapsulated liquid crystal.

EXAMPLE 4

The following is an example of preparation of the stacked layers of materials for a lift-off display film with adhesive and casting layers. An operable 4×1 pixel passive matrix cholesteric display lift-off film was made by first coating and printing the various display elements on a release liner to form a display film, then lifting the film off of the liner forming the lift-off film for subsequent lamination on a fabric substrate. The release liner was the same as in Example 1. The casting layer was a 12.5 micron polycarbonate plastic sheet laminated with a pressure sensitive adhesive layer. The sequence of the layers is similar to that in the Example 1 with the exception of the casting and adhesion layers. Following the coating and drying of the layers the display film from the adhesion layer to the clear protective coat was lifted off from the release liner and laminated onto black soft cloth. The display was fully operational after transfer to the final substrate. The bistable cholesteric material was addressed to the planar (yellow reflective) by application of 110 volts or to the focal conic with application of 55 volts. The display film had a contrast ratio of 12:1 and a brightness of 30%.

EXAMPLE 5

The following is an example of preparation of the stacked layers of materials for a lift-off display with an adhesive and casting layer. The display had the same sequence of layers as in Example 1 except that the release liner was a paper sheet with a peel-off adhesive transparent layer that served as a casting layer (Avery laminating sheets 73602). To establish a black background for the reflective display a black paint (KRYLON) was coated on the casting layer by spraying and dried at room temperature. A 2×2 pixel display was prepared as follows. First, a layer of conductive polymer (ELP3040) was deposited with Meyer rod on the black paint and cured at 80° C. for 15 minutes. Next, a layer of encapsulated liquid crystal and second conductive electrode were deposited the same way as described in Example 1. The display did not have a clear coat layer as a top layer. The display film had a contrast ratio of 18:1 and brightness of 34%. The driving voltage was 95 V for achieving the planar state and 60 V for achieving the focal conic state.

EXAMPLE 6

An operable 1×7 pixel passive matrix cholesteric display with two electro-active layers was made by coating and printing the various display elements on a release liner to form a display film, then lifting the film off of the liner for subsequent lamination on a substrate. The release liner with casting layer, patterned conductive polymer layer, encapsulated ChLC layer and the second conductive electrode were the same as in Example 1 except that the second conductive electrode was not patterned and was deposited over a mask which provides a solid electrode. No clear coat layer was deposited on the second transparent electrode. Instead, a thin isolation layer coated from aqueous gelatin solution (HiPure gelatin, Norland Products) was deposited with a doctor blade. A second layer of yellow encapsulated ChLC in polyurethane binder (NeoRes R967) was coated from a water-based emulsion on the isolation layer with doctor blade. The thickness of the second encapsulated ChLC layer was approximately 8–10 μm. A third conductive transparent electrode made of conductive polymer Dipcoat was deposited over a mask using air brushing and cured at room temperature. The mask provides a patterned electrode of the passive matrix display. Finally, the top clear coat as in Example 1 was coated on the third conductive electrode. Each encapsulated ChLC layer can be addressed separately.

EXAMPLE 7

An operable 1×7 pixel passive matrix cholesteric display with two electro-active layers was made by coating and printing the various display elements on a release liner to form a display film, then lifting the film off of the liner for subsequent lamination on a substrate. The sequence of the layers is the same as in the Example 6 except that there is no isolation layer between the second conductive electrode and the second ChLC layer. The color of the first ChLC layer was red and the color of the second ChLC layer was green. In this Example the second ChLC layer consisted of two sub-layers. The first sub-layer was an isolation layer and was coated from an aqueous emulsion of green microencapsulated ChLC on the second conductive electrode using the doctor blade. Microencapsulated ChLC droplets with sizes ranging from 2–20 microns had individual shells made of cross-linked gelatin and gum Arabic using complex coacervation process (LCR, Ml). The purpose of this sub-layer was two-fold. It served as an isolation layer to prevent mixing of red and green ChLCs, and being electro-active improved the droplet fill factor and increased the display brightness. The second sub-layer was a major electro-optical layer of the green encapsulated ChLC, and was deposited from aqueous emulsion as in Example 6.

EXAMPLE 8

An operable 16×16 pixel passive matrix cholesteric display with two electro-active layers was made by coating and printing the various display elements on a release liner to form a display film, then lifting the film off of the liner for subsequent lamination on a substrate. The sequence of the layers is the same as in the Example 7 except that the first and third conductive electrodes were patterned to form rows and columns as in Example 1.

EXAMPLE 9

An operable 1×7 pixel passive matrix cholesteric display with one electroactive layer was made by coating and printing the various display elements on a release liner to form a display film, then lifting the film off of the liner for subsequent lamination on a substrate. The sequence of the material layers is the same as in the Example 3 except that the casting layer was made of 0.5 mil clear PET film with optical pressure sensitive adhesive (PSA) layer on a release liner (from Grafix Plastic, Cleveland, Ohio). The display film including all of the layers from the casting layer with PSA layer to the clear coat was lifted off from the release liner and laminated on the fabric substrate. The display film had a brightness of 32%. The driving voltage was 110 V for the planar state and 55 V for the focal conic state.

EXAMPLE 10

The sequence of the materials layers is the same as in the Example 9 except that the casting layer was made of 1 mil LB grade clear acetate film (from Grafix Plastic, Cleveland, Ohio). The display film had a brightness of 31%. The driving voltage was 120 V for the planar state and 60 V for the focal conic state.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal display comprising:
a substrate and a multi-layer stack of components of the display supported on said substrate, said display including only one said substrate, said components of the display comprising:
a plurality of liquid crystal dispersion layers comprising: a first liquid crystal dispersion layer stacked over said substrate and a second liquid crystal dispersion layer stacked over said first liquid crystal dispersion layer;
wherein said first dispersion layer and said second dispersion layer comprise regions of cholesteric liquid crystal material dispersed in a polymer matrix material;
multiple electrically conductive layers including: a first electrically conductive layer stacked between said first dispersion layer and said substrate, an intermediate said electrically conductive layer stacked between said first dispersion layer and said second dispersion layer, and a second electrically conductive layer stacked over said second dispersion layer; and
a protective polymer film layer, wherein said substrate forms one outer surface of the display and said protective film layer forms another outer surface of the display; and
drive electronics adapted to electrically address said liquid crystal material of said first dispersion layer and said second dispersion layer between adjacent said electrically conductive layers effective to produce images from the display.

2. A liquid crystal display comprising:
a substrate and a multi-layer stack of components of the display supported on said substrate, said display including only one said substrate and having a side that is proximal to said substrate and a side that is distal from said substrate, said display being constructed and arranged to be viewed from said distal side and adapted to absorb light near said proximal side, said components of the display comprising:
a first electrically conductive layer stacked over said substrate near said proximal side of the display;
a liquid crystal dispersion layer comprising regions of cholesteric liquid crystal material dispersed in a polymer matrix stacked over said first electrically conductive layer;
a second optically transparent electrically conductive layer stacked over said liquid crystal dispersion layer, and
drive electronics adapted to electrically address pixels of said liquid crystal material effective to produce images from the display.

3. The display of claim 2 comprising a planarization layer located on one of the layers of the display.

4. The display of claim 2 comprising a layer of polyurethane latex interposed between said substrate and said first electrically conductive layer.

5. The display of claim 2 comprising an electrical insulation layer adjacent said dispersion layer.

6. The display of claim 2 wherein at least one of said first and second electrically conductive layers comprises conductive polymer or carbon nanotube material.

7. The display of claim 2 wherein said multi-layer stack of components are formed by at least one of printing and coating.

8. The display of claim 2 wherein said multi-layer stack of components are formed and then laminated.

9. The display of claim 2 wherein said liquid crystal material has a positive dielectric anisotropy and a pitch length effective to reflect visible or infrared electromagnetic radiation.

10. The display of claim 2 wherein one of said first and second electrically conductive layers includes parallel lines of conductive electrodes extending in a first direction on a first side of said dispersion layer proximal to said substrate, and another of said first and second electrically conductive layers includes parallel lines of conductive electrodes extending in a second direction that is orthogonal to said first direction on an opposite side of said dispersion layer.

11. The display of claim 2 wherein some of said display components of the multilayer stack are formed by printing or coating as films onto a release surface, curing said display component films, removing said display component films from the release surface and transferring said display component films onto said substrate, and other of said display components are separately formed and laminated as one of the layers of said multilayer stack or applied directly to said substrate.

12. The display of claim 11 comprising a casting layer applied on or near the release surface on which other said layers of the display are prepared, said casting layer being selected from the group consisting of a preparation layer, said first electrically conductive layer, an adhesive layer, a planarization layer, said dispersion layer, an isolation layer and combinations thereof.

13. The display of claim 2 wherein said multi-layer stack of components are formed directly on said substrate.

14. The display of claim 2 comprising at least one layer near said dispersion layer that is adapted to perform at least one of the following functions: electrical insulation and chemical diffusion barrier.

15. The display of claim 2 wherein said substrate has a thickness of at least 20 microns.

16. The display of claim 2 wherein said substrate has a thickness of at least 50 microns.

17. The display of claim 2 wherein said substrate comprises a solar panel effective to provide power to said drive electronics.

18. The display of claim 2 wherein said dispersion layer comprises a first dispersion sublayer in which said liquid crystal material has a left hand helical twist and a second dispersion sublayer in which said liquid crystal material has a right hand helical twist.

19. A liquid crystal display comprising:
a substrate and a multi-layer stack of components of the display supported on said substrate, said components being formed by printing or coating as films, said display including only one said substrate and having a side that is proximal to said substrate and a side that is distal from said substrate, said display being constructed and arranged to be viewed from said distal side and adapted to absorb light near said proximal side, said components of the display comprising:
a first electrically conductive layer stacked over said substrate near said proximal side of the display, said first electrically conductive layer comprising first parallel lines of electrodes extending in a first direction;
a liquid crystal dispersion layer comprising regions of cholesteric liquid crystal material dispersed in a polymer matrix stacked over said first electrically conductive layer;
a second optically transparent electrically conductive layer stacked over said dispersion layer comprising second parallel lines of transparent electrodes extending in a second direction that is orthogonal to said first direction;
an optically transparent polymer film layer forming an outermost portion of said distal side of the display; and
drive electronics adapted to electrically address pixels of said liquid crystal material effective to produce images from the display.

20. The display of claim 19 comprising a planarization layer located on one of the layers of the display.

21. The display of claim 19 comprising a layer of polyurethane latex interposed between said substrate and said first electrically conductive layer.

22. The display of claim 19 comprising an electrical insulation layer adjacent said dispersion layer.

23. The display of claim 19 wherein at least one of said first and second electrically conductive layers comprises conductive polymer or carbon nanotube material.

24. The display of claim 19 wherein said liquid crystal material has a positive dielectric anisotropy and a pitch length effective to reflect visible or infrared electromagnetic radiation.

25. The display of claim 19 wherein some of said display components of the multilayer stack are formed by printing or coating as films onto a release surface, curing said display component films, removing said display component films from the release surface and transferring said display component films onto said substrate, and other of said display components are separately formed and laminated as one of the layers of said multilayer stack or applied directly to said substrate.

26. The display of claim 25 comprising a casting layer applied on or near the release surface on which other said layers of the display are prepared, said casting layer being selected from the group consisting of a preparation layer, said first electrically conductive layer, an adhesive layer, a planarization layer, said dispersion layer, an isolation layer and combinations thereof.

27. The display of claim 19 comprising at least one layer near said dispersion layer that is adapted to perform at least one of the following functions: electrical insulation and chemical diffusion barrier.

28. The display of claim 19 wherein said substrate has a thickness of at least 20 microns.

29. The display of claim 19 wherein said substrate has a thickness of at least 50 microns.

30. The display of claim 19 wherein said substrate comprises a solar panel effective to provide power to said drive electronics.

31. A liquid crystal display comprising:
a substrate and a multi-layer stack of components of the display supported on said substrate, said display including only one said substrate and having a side that is proximal to said substrate and a side that is distal from said substrate, said display being constructed and arranged to be viewed from said distal side and adapted to absorb light near said proximal side, said components of the display comprising:
a first electrically conductive layer stacked over said substrate near said proximal side of the display;
a liquid crystal dispersion layer comprising regions of cholesteric liquid crystal material dispersed in a polymer matrix stacked over said first electrically conductive layer;

a second optically transparent electrically conductive layer stacked over said liquid crystal dispersion layer; and wherein said substrate comprises a photovoltaic, and said photovoltaic is adapted to enable said dispersion layer to be optically addressed between said first electrically conductive layer adjacent said photovoltaic and said second electrically conductive layer.

32. The display of claim 31 comprising an optically transparent polymer film layer that forms an outermost portion of said distal side of the display.

33. A liquid crystal display comprising:
a substrate and a multi-layer stack of components of the display supported on said substrate, said display including only one said substrate and having a side that is proximal to said substrate and a side that is distal from said substrate, said display being constructed and arranged to be viewed from said distal side and adapted to absorb light near said proximal side, said components of the display comprising:
a first electrically conductive layer stacked over said substrate near said proximal side of the display;
a liquid crystal dispersion layer comprising regions of cholesteric liquid crystal material dispersed in a polymer matrix stacked over said first electrically conductive layer;
a second optically transparent electrically conductive layer stacked over said liquid crystal dispersion layer; and
wherein said substrate and said first electrically conductive layer comprise an active matrix device effective to apply voltage pulses to independently drive pixels of said dispersion layer.

34. The display of claim 33 wherein said active matrix device comprises an array of thin film transistors adapted to apply voltage pulses to said pixels.

35. The display of claim 33 comprising an optically transparent polymer film layer that forms an outermost portion of said distal side of the display.

36. The display of claim 35 wherein said active matrix device comprises an array of thin film transistors adapted to apply voltage pulses to said pixels.

37. A liquid crystal display comprising:
a substrate and a multi-layer stack of components of the display supported on said substrate, said display including only one said substrate, said components of the display comprising:
at least two stacked liquid crystal dispersion layers, each of said dispersion layers comprising regions of reflective liquid crystal material dispersed in a polymer matrix material; and
a plurality of electrically conductive layers, an intermediate said electrically conductive layer being disposed between adjacent said dispersion layers;
wherein said display includes a black layer adapted to absorb light passing through said liquid crystal dispersion layers; and
drive electronics adapted to electrically address pixels of said liquid crystal material between adjacent said electrically conductive layers effective to produce images from the pixels of the display.

38. The display of claim 37 comprising a first said electrically conductive layer located between said substrate and one of said dispersion layers and a second said electrically conductive layer located over one of said dispersion layers remote from said substrate.

39. The display of claim 38 comprising a planarization layer located on one of the layers of the display.

40. The display of claim 38 comprising a layer of polyurethane latex interposed between said substrate and said first electrically conductive layer.

41. The display of claim 38 wherein said first electrically conductive layer is comprised of said substrate.

42. The display of claim 37 comprising an electrical insulation layer disposed between one of said electrically conductive layers and an adjacent said dispersion layer.

43. The display of claim 37 further including a protective polymer film disposed as an outermost layer of said display remote from said substrate.

44. The display of claim 37 wherein one side of said substrate is smoother than an opposite side of said substrate.

45. The display of claim 37 wherein one side of said substrate is made smoother by deposition of a layer of material thereon.

46. The display of claim 37 wherein at least one of said electrically conductive layers comprises conductive polymer or carbon nanotube material.

47. The display of claim 37 wherein said liquid crystal dispersion layers comprise cholesteric liquid crystal material exhibiting focal conic and planar textures that are stable in an absence of an electric field.

48. The display of claim 37 wherein said liquid crystal material has a positive dielectric anisotropy and a pitch length effective to reflect visible or infrared electromagnetic radiation.

49. The display of claim 37 wherein each of said dispersion layers is independently electrically addressable by said drive electronics between adjacent said electrically conductive layers.

50. The display of claim 37 wherein at least one of said dispersion layers comprises a first dispersion sublayer in which said liquid crystal material has a left hand helical twist and a second dispersion sublayer in which said liquid crystal material has a right hand helical twist.

51. The display of claim 37 wherein the multi-layer stack of display components is formed by printing or coating said display components as films.

52. The display of claim 51 wherein said films are formed directly on said substrate.

53. The display of claim 37 comprising at least one layer stacked between adjacent said dispersion layers that is adapted to perform at least one of the following functions: electrical insulation and chemical diffusion barrier.

54. The display of claim 37 wherein said substrate has a thickness of at least 20 microns.

55. The display of claim 37 wherein said substrate has a thickness of at least 50 microns.

56. The display of claim 37 wherein said substrate comprises a solar panel effective to provide power to said drive electronics.

57. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material, wherein said dispersion layer comprises a dispersion of droplets of said liquid crystal material;
electrically conductive layers flanking said dispersion layer; and drive electronics adapted to electrically address pixels of said liquid crystal material between said electrically conductive layers effective to produce images from the pixels of the display.

58. The display of claim 57 wherein said dispersion is at least one of an emulsion and a microencapsulated liquid crystal material.

59. The display of claim 57 wherein said dispersion comprises an emulsion of cholesteric liquid crystal material dispersed in a polyurethane latex.

60. The display of claim 59 wherein said emulsion comprises a mix of liquid crystal and latex in a ratio of from about 2:1 to about 6:1.

61. The display of claim 57 wherein said dispersion contains cholesteric liquid crystal droplets encapsulated in a polymeric shell.

62. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material;
electrically conductive layers flanking said dispersion layer; and
drive electronics adapted to electrically address pixels of said liquid crystal material between said electrically conductive layers effective to produce images from the pixels of the display;
wherein one of said electrically conductive layers includes parallel lines of conductive electrodes extending in a first direction on a first side of said dispersion layer proximal to said substrate, and another of said electrically conductive layers includes parallel lines of conductive electrodes extending in a second direction that is orthogonal to said first direction on an opposite side of said dispersion layer.

63. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material;
electrically conductive layers flanking said dispersion layer; and
drive electronics adapted to electrically address pixels of said liquid crystal material between said electrically conductive layers effective to produce images from the pixels of the display;
wherein the multilayer stack of said display components is formed by printing or coating said display components as films onto a release surface, curing said display component films, removing said display component films from the release surface and transferring said display component films onto said substrate.

64. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material;
electrically conductive layers flanking said dispersion layer; and
drive electronics adapted to electrically address pixels of said liquid crystal material between said electrically conductive layers effective to produce images from the pixels of the display;
wherein some of said display components of the multi-layer stack are formed by printing or coating as films onto a release surface, curing said display component films, removing said display component films from the release surface and transferring said display component films onto said substrate, and other of said display components are separately formed and laminated as one of the layers of said multilayer stack or applied directly to said substrate.

65. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material;
electrically conductive layers flanking said dispersion layer; and
wherein said substrate comprises a photovoltaic, and said photovoltaic is adapted to enable said dispersion layer to be optically addressed between said electrically conductive layers.

66. A liquid crystal display comprising:
a substrate and a multi-layer stack of components of the display supported on said substrate, said display including only one said substrate, said components of the display comprising:
at least one liquid crystal dispersion layer, said dispersion layer comprising regions of reflective liquid crystal material dispersed in a polymer matrix material;
electrically conductive layers flanking said dispersion layer; and
wherein said substrate and one of said electrically conductive layers comprise an active matrix device effective to apply voltage pulses to independently drive pixels of said dispersion layer.

67. The display of claim 66 wherein said active matrix device comprises an array of thin film transistors adapted to apply voltage pulses to said pixels.

* * * * *

(12) EX PARTE REEXAMINATION CERTIFICATE (8127th)
United States Patent
Doane et al.

(10) Number: US 7,170,481 C1
(45) Certificate Issued: Mar. 29, 2011

(54) SINGLE SUBSTRATE LIQUID CRYSTAL DISPLAY

(75) Inventors: Joseph W. Doane, Kent, OH (US); Asad A. Khan, Kent, OH (US); Irina Shiyanovskaya, Stow, OH (US); Tod Schneider, Kent, OH (US); Oleg Pishnyak, Kent, OH (US); Seth E. Green, Kent, OH (US); Forrest N. Nicholson, Kent, OH (US); Liang-Chy Chien, Hudson, OH (US)

(73) Assignee: Kent Displays Incorporated, Kent, OH (US)

Reexamination Request:
No. 90/010,931, Apr. 14, 2010

Reexamination Certificate for:
Patent No.: 7,170,481
Issued: Jan. 30, 2007
Appl. No.: 11/046,487
Filed: Jan. 28, 2005

Related U.S. Application Data

(63) Continuation of application No. 11/006,100, filed on Dec. 7, 2004, now Pat. No. 7,236,151, and a continuation of application No. 10/782,461, filed on Feb. 19, 2004, now Pat. No. 7,190,337.
(60) Provisional application No. 60/539,873, filed on Jan. 28, 2004, provisional application No. 60/598,163, filed on Aug. 2, 2004, and provisional application No. 60/484,337, filed on Jul. 2, 2003.

(51) Int. Cl.
*G09G 3/36* (2006.01)

(52) U.S. Cl. .......................... 345/87; 345/31
(58) Field of Classification Search ................ None
See application file for complete search history.

(56) References Cited

U.S. PATENT DOCUMENTS 4,566,935 A 1/1986 Hornbeck
4,680,579 A 7/1987 Ott
6,017,468 A 1/2000 Chung et al.

(Continued)

FOREIGN PATENT DOCUMENTS

| EP | 1058147 | 12/2000 |
|---|---|---|
| JP | 3168613 | 7/1991 |
| WO | 02/093240 | 11/2002 |
| WO | 2004029708 | 4/2004 |

OTHER PUBLICATIONS

R.D. Sterling et al:, "Video–Rate Liquid Crystal Light Valve Using Amorphous Silicon Photoconductor" proceedings of the SID, XXI, 327–329 (1990).

(Continued)

*Primary Examiner*—Tuan H Nguyen

(57) ABSTRACT

The present invention relates to a display film that may be transferred by lamination or otherwise onto a substrate. The display film is formed of a stack of layers that can include different types, arrangements, and functionality within the stack depending upon factors including the characteristics of the substrate (e.g., upper or lower, transparent or opaque, substrates) and addressing of the display (e.g., active or passive matrix, electrical or optical addressing). The layers of the stacked display film include one or more electrode layers and one or more liquid crystal layers and, in addition, may include various combinations of an adhesive layer, preparation layer, casting layer, light absorbing layer, insulation layers, and protective layers. The liquid crystal layer can include cholesteric or other liquid crystal material. The liquid crystal layer can be a dispersion of liquid crystal in a polymer matrix formed by a variety of techniques. The display film may interact with components mounted on or laminated to the substrate, including a solar cell, active matrix backplane and electrodes. The display film may be mounted onto flexible or drapable substrates such as fabric and can itself be drapable. A liquid crystal display includes the display film and a single substrate for supporting the display film. Thus, the invention offers substantial flexibility in fabrication and design that has not been previously possible in the display industry.

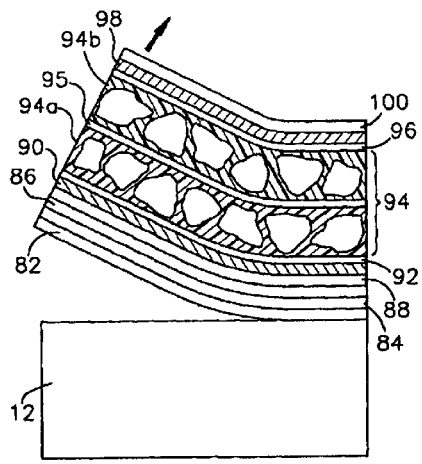

U.S. PATENT DOCUMENTS

| | | | |
|---|---|---|---|
| 6,147,741 | A | 11/2000 | Chen et al. |
| 6,518,944 | B1 | 2/2003 | Doane et al. |
| 6,723,479 | B2 | 4/2004 | van de Witte et al. |
| 6,977,099 | B2 | 12/2005 | Umeya et al. |
| 7,072,095 | B2 | 7/2006 | Liang et al. |
| 7,170,481 | B2 | 1/2007 | Doane et al. |
| 7,236,151 | B2 | 6/2007 | Doane et al. |
| 2003/0214471 | A1 | 11/2003 | Topelberg |
| 2005/0003144 | A1 | 1/2005 | Buttgen et al. |
| 2005/0179678 | A1 | 8/2005 | Nose et al. |
| 2005/0195354 | A1 | 9/2005 | Doane et al. |
| 2006/0066803 | A1 * | 3/2006 | Aylward et al. ............. 349/158 |
| 2006/0124899 | A1 | 6/2006 | Welter |
| 2007/0026163 | A1 | 2/2007 | Schneider et al. |

OTHER PUBLICATIONS

H. Hiji et al., SID Digest of Papers, vol. XXXIV, 1560–1563, (2005).

E. Sackman, J. Chem. Phys. Soc., 93, 7088–7090 (1971).

T. Ikeda, J. Mater. Chem., 13, 2037–2057 (2003).

S. Pieraccini et al., Chem. Comm., 598–599 (2003).

S. Pieraccini et al., Chem. Eur. J., 10, 5632–5639 (2004).

B.L. Feringa et al., J. Chem. Soc. Chem. Comm., 288–290, (1993).

B.L. Feringa et al., Chemical Reviews, vol. 100, pp. 1789–1816 (2000).

Li et al., J. Am. Chem. Soc., 9 vol. 129, pp. 12908–12909 (2007).

A. Bobrovsky et al., Polymers for Advanced Technologies, vol. 13, pp. 595–600 (2002).

M. Brehmer et al., Advanced Materials, 10, 1438–1441 (1998).

P. van de Witte et al., Journal of Applied Physics, 85, 7517–7521 (1999).

J.W. Doane et al., Proceedings of Japan Display '92 (Hiroshima), pp. 73–76 (1992).

Fundamentals of Liquid Crystal Devices, D–K Yang and S.T. Wu, Chapter 1 (John Wiley & Sons, New York 2006).

* cited by examiner

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 5-7, 18, 19, 22, 23, 37, 38, 42-44, 46, 50, 63 and 64 is confirmed.

Claims 13-16, 27-29, 49 and 52-55 are cancelled.

Claims 3, 8-12, 20, 24-26, 39, 45, 47, 48, 51, 57, 58, 61 and 62 are determined to be patentable as amended.

Claims 4, 17, 21, 30-36, 40-41, 56, 59-60 and 65-67 were not reexamined.

3. The display of claim 2 comprising a planarization layer located on [one of the layers of the display] *said substrate*.

8. The display of claim 2 wherein said multi-layer stack of components are [formed and then] laminated.

9. The display of claim 2 wherein said liquid crystal material has a positive dielectric anisotropy and [a pitch length effective to] *can* reflect visible or infrared electromagnetic radiation.

10. The display of claim 2 wherein [one of said first and second electrically conductive layers includes parallel lines of conductive electrodes extending in a first direction on a first side of said dispersion layer proximal to said substrate, and another of said first and second electrically conductive layers includes parallel lines of conductive electrodes extending in a second direction that is orthogonal to said first direction on an opposite side of said dispersion layer] *said first conducting electrode is patterned as parallel strips to form rows of conducting electrodes and said second conducting electrode is patterned as parallel strips to form columns of conducting electrodes, said rows of conducting electrodes and said columns of conducting electrodes being perpendicular to each other*.

11. The display of claim 2 wherein some of said display components of the multilayer stack are formed by printing or coating as films onto a release surface, curing *or drying* said display component films, removing said display component films from the release surface and transferring said display component films onto said substrate, and other of said display components are [separately formed and] laminated as one of the layers of said multilayer stack or applied directly to said substrate.

12. The display of claim 11 comprising a casting layer applied on or near the release surface on which other said layers of the display are prepared[, said casting layer being selected from the group consisting of a preparation layer, said first electrically conductive layer, an adhesive layer, a planarization layer, said dispersion layer, an isolation layer and combinations thereof].

20. The display of claim 19 comprising a planarization layer located on [one of the layers of the display] *said substrate*.

24. The display of claim 19 wherein said liquid crystal material has a positive dielectric anisotropy and [a pitch length effective to] *can* reflect visible or infrared electromagnetic radiation.

25. The display of claim 19 wherein some of said display components of the multilayer stack are formed by printing or coating as films onto a release surface, curing *or drying* said display component films, removing said display component films from the release surface and transferring said display component films onto said substrate, and other of said display components are [separately formed and] laminated as one of the layers of said multilayer stack or applied directly to said substrate.

26. The display of claim 25 comprising a casting layer applied on or near the release surface on which other said layers of the display are prepared[, said casting layer being selected from the group consisting of a preparation layer, said first electrically conductive layer, an adhesive layer, a planarization layer, said dispersion layer, an isolation layer and combinations thereof].

39. The display of claim 38 comprising a planarization layer located on [one of the layers of the display] *said substrate*.

45. The display of claim 37 wherein one side of said substrate is made smoother by [deposition of] *coating* a layer of material thereon.

47. The display of claim 37 wherein said liquid crystal dispersion layers comprise *bistable* cholesteric liquid crystal material [exhibiting focal conic and planar textures that are stable in an absence of an electric field].

48. The display of claim 37 wherein said liquid crystal material has a positive dielectric anisotropy and [a pitch length effective to] *can* reflect visible or infrared electromagnetic radiation.

51. The display of claim 37 wherein the multi-layer stack of display components is formed by printing or coating [said display components as films].

57. A liquid crystal display comprising:
a substrate and a multi-layer stack of components of the display supported on said substrate, said display including only one said substrate, said components of the display comprising:
[at least one] *three cholesteric* liquid crystal dispersion [layer] *layers reflecting red, green and blue*, *each* said dispersion layer comprising regions of reflective *cholesteric* liquid crystal material dispersed in a polymer matrix material, wherein *each* said dispersion layer comprises a dispersion of droplets of said liquid crystal material;
electrically conductive layers flanking *each* said dispersion layer; and
drive electronics adapted to electrically address pixels of said liquid crystal material between said electrically conductive layers effective to produce images from the pixels of the display.

58. The display of claim 57 wherein *each* said dispersion is [at least one of] an emulsion[and], *a phase separated liquid crystal material or* a microencapsulated liquid crystal material.

61. The display of claim 57 wherein said dispersion contains cholesteric liquid crystal droplets encapsulated in [a polymeric shell] *said polymer*.

62. A liquid crystal display comprising:
a substrate and a multi-layer stack of components of the display supported on said substrate, said display including only one said substrate, said components of the display comprising:

[at least one] *three cholesteric* liquid crystal dispersion [layer] *layers reflecting red, green and blue,* each said dispersion layer comprising regions of reflective *cholesteric* liquid crystal material dispersed in a polymer matrix material;

electrically conductive layers flanking *each* said dispersion layer; and drive electronics adapted to electrically address pixels of said liquid crystal material between said electrically conductive layers effective to produce images from the pixels of the display;

[one of said electrically conductive layers includes parallel lines of conductive electrodes extending in a first direction on a first side of said dispersion layer proximal to said substrate, and another of said electrically conductive layers includes parallel lines of conductive electrodes extending in a second direction that is orthogonal to said first direction on an opposite side of said dispersion layer] *wherein one of said conductive layers is patterned as parallel strips to form rows of conducting electrodes and another of said conductive layers is patterned as parallel strips to form columns of conducting electrodes, said rows of conducting electrodes and said columns of conducting electrodes being perpendicular to each other.*

\* \* \* \* \*